US009621976B2

(12) United States Patent
Han et al.

(10) Patent No.: US 9,621,976 B2
(45) Date of Patent: Apr. 11, 2017

(54) GLASSES APPARATUS FOR WATCHING DISPLAY IMAGE

(71) Applicant: SAMSUNG ELECTRONICS CO., LTD., Suwon-si (KR)

(72) Inventors: Jea-hee Han, Yongin-si (KR); Je-hwan Seo, Daegu (KR); Ju-won Cho, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

(21) Appl. No.: 14/701,578

(22) Filed: May 1, 2015

(65) Prior Publication Data
US 2015/0237430 A1 Aug. 20, 2015

Related U.S. Application Data

(63) Continuation of application No. 13/738,114, filed on Jan. 10, 2013, now Pat. No. 9,036,847.

(30) Foreign Application Priority Data

Jan. 10, 2012 (KR) .................. 10-2012-0003180
Jul. 2, 2012 (KR) .................. 10-2012-0071790
Oct. 23, 2012 (KR) .................. 10-2012-0117933

(51) Int. Cl.
H04R 1/10 (2006.01)
H04N 13/04 (2006.01)
(Continued)

(52) U.S. Cl.
CPC .......... *H04R 1/105* (2013.01); *H04N 13/0429* (2013.01); *H04N 13/0434* (2013.01);
(Continued)

(58) Field of Classification Search
CPC .......... H04N 13/0438; H04N 13/0445; H04N 2013/0461; H04N 2013/0463; H04N 2013/0465
(Continued)

(56) References Cited

U.S. PATENT DOCUMENTS 4,902,120 A 2/1990 Weyer
6,091,832 A 7/2000 Shurman et al.
(Continued)

FOREIGN PATENT DOCUMENTS

CN 101966393 A 2/2011
EP 2378785 A2 10/2011
(Continued)

OTHER PUBLICATIONS

Communication dated Jan. 15, 2016, issued by the European Patent Office in counterpart European Application No. 13189215.0.
(Continued)

Primary Examiner — Jesse Elbin
(74) Attorney, Agent, or Firm — Sughrue Mion, PLLC

(57) ABSTRACT

A glasses apparatus which works in conjunction with a display apparatus which operates in a multi-view mode to combine and output a plurality of contents. The glasses apparatus includes: a first interface module which receives a synchronization signal in a first wireless communication method; first and second glasses mounted on a glasses frame and which are driven in synchronization with one of the plurality of contents based on the synchronization signal; a second interface module which receives an audio signal of at least said one content in a second wireless communication method; a controller which selects an audio signal of said one content from among audio signals corresponding to the plurality of contents, and an audio outputter which outputs
(Continued)

the audio signal of the selected content, and which is integrally formed with the glasses frame.

27 Claims, 19 Drawing Sheets

(51) Int. Cl.
*H04R 1/02* (2006.01)
*H04N 5/04* (2006.01)

(52) U.S. Cl.
CPC ..... *H04N 13/0438* (2013.01); *H04R 13/0497* (2013.01); *H04R 1/028* (2013.01); *H04N 5/04* (2013.01); *H04N 2013/0463* (2013.01); *H04N 2013/0465* (2013.01); *H04N 2213/001* (2013.01); *H04N 2213/008* (2013.01)

(58) Field of Classification Search
USPC ............... 381/301, 327, 330, 374, 381, 388
See application file for complete search history.

(56) References Cited

U.S. PATENT DOCUMENTS

| | | | |
|---|---|---|---|
| 6,188,442 B1 | 2/2001 | Narayanaswami |
| 7,004,582 B2 | 2/2006 | Jannard et al. |
| 7,124,425 B1 | 10/2006 | Anderson, Jr. et al. |
| 7,147,324 B2 | 12/2006 | Jannard et al. |
| 7,213,917 B2 | 5/2007 | Jannard et al. |
| 7,216,973 B2 | 5/2007 | Jannard et al. |
| 7,264,350 B2 | 9/2007 | Jannard et al. |
| 7,445,332 B2 | 11/2008 | Jannard et al. |
| 7,494,216 B2 | 2/2009 | Jannard et al. |
| 7,512,414 B2 | 3/2009 | Jannard et al. |
| 8,155,335 B2 | 4/2012 | Rutschman |
| 8,269,822 B2 | 9/2012 | Zalewski |
| 8,325,935 B2 | 12/2012 | Rutschman |
| 2004/0156012 A1 | 8/2004 | Jannard et al. |
| 2004/0157649 A1 | 8/2004 | Jannard et al. |
| 2004/0160571 A1 | 8/2004 | Jannard et al. |
| 2004/0160572 A1 | 8/2004 | Jannard et al. |
| 2005/0046789 A1 | 3/2005 | Jannard et al. |
| 2005/0046790 A1 | 3/2005 | Jannard et al. |
| 2005/0128431 A1 | 6/2005 | Jannard et al. |
| 2006/0146277 A1 | 7/2006 | Jannard et al. |
| 2006/0197907 A1 | 9/2006 | Jannard et al. |
| 2007/0248238 A1 | 10/2007 | Abreu |
| 2008/0226094 A1 | 9/2008 | Rutschman |
| 2009/0097688 A1 | 4/2009 | Lewis |
| 2010/0007582 A1 | 1/2010 | Zalewski |
| 2011/0227813 A1 | 9/2011 | Haddick et al. |
| 2011/0254934 A1 | 10/2011 | Yoon et al. |
| 2011/0316992 A1 | 12/2011 | Cheng et al. |
| 2012/0004919 A1 | 1/2012 | Muth |
| 2012/0155670 A1 | 6/2012 | Rutschman |
| 2012/0190439 A1 | 7/2012 | Nourbakhsh |
| 2013/0093956 A1 | 4/2013 | Macleod |

FOREIGN PATENT DOCUMENTS

| | | |
|---|---|---|
| EP | 2385706 A1 | 11/2011 |
| EP | 2398248 A2 | 12/2011 |
| JP | 2005-534269 A | 11/2005 |
| JP | 2006-186768 A | 7/2006 |
| JP | 2007-72015 A | 3/2007 |
| JP | 2008-067258 A | 3/2008 |
| JP | 2008-167210 A | 7/2008 |
| JP | 2008-545287 A | 12/2008 |
| JP | 2009-527134 A | 7/2009 |
| JP | 2010-523018 A | 7/2010 |
| JP | 2011-033749 A | 2/2011 |
| KR | 2002-0011746 A | 2/2002 |
| KR | 20020078755 A | 10/2002 |
| KR | 1020110115806 A | 10/2011 |
| WO | 2007-081745 A2 | 7/2007 |
| WO | 2011133172 A1 | 10/2011 |

OTHER PUBLICATIONS

Communication issued Jul. 7, 2015, issued by Japanese Patent Office in counterpart Japanese Patent Application No. 2014-17855 (2013-1592).
Communication dated Apr. 24, 2013 from the European Patent Office in counterpart application No. 13150349.2.
Communication dated Feb. 19, 2013 from the Korean Intellectual Property Office in counterpart Korean application No. 10-2012-0117933.
Communication dated Nov. 12, 2013, issued by the Japanese Patent Office in counterpart Japanese Application No. 2013-001592.
Communication dated Dec. 10, 2013, issued by the European Patent Office in counterpart European Application No. 13150349.2.
Communication dated Dec. 11, 2013, issued by the European Patent Office in counterpart European Application No. 13189215.0.
Communication dated May 7, 2014, issued by the Japanese Patent Office in counterpart Japanese Application No. 2013-001592.
Communication dated Jul. 1, 2014, issued by the European Patent Office in counterpart European Application No. 13150349.2.
Communication dated Aug. 5, 2014 issued by the State Intellectual Property Office of the People's Republic of China in counterpart Chinese application No. 201310009659.9.

GLASSES APPARATUS FOR WATCHING DISPLAY IMAGE

CROSS-REFERENCE TO RELATED APPLICATIONS

This application is a continuation of U.S. patent application Ser. No. 13/738,114, filed on Jan. 10, 2013, which claims priority under 35 U.S.C. §119(a) from Korean Patent Applications No. 10-2012-0003180 filed Jan. 10, 2012, No. 10-2012-0071790 filed Jul. 2, 2012 and No. 10-2012-0117933 filed Oct. 23, 2012 in the Korean Intellectual Property Office, the disclosures of which are incorporated herein by reference in their entirety.

BACKGROUND

1. Field

Apparatuses and methods consistent with exemplary embodiments broadly relate to a glasses apparatus for watching display images.

2. Description of the Related Art

With the development of electronic technology, various types of electronic products have been developed and distributed. Particularly, various types of display apparatuses, such as TVs, cell-phones, PCs, notebook PCs, PDAs, etc., have been widely used in general households.

With the increasing use of the display apparatuses, user demands for more of various functions for the display apparatuses has increased. Accordingly, manufacturers put in more effort to meet the user demands so that products having new functions such as a provision of a 3D content, etc. are emerging.

Also, in recent years, development efforts are being made for display apparatuses and glasses apparatuses which can simultaneously display a plurality of contents and allow multiple users to watch different content.

Accordingly, when a user selects a single content which he or she wants to watch among a plurality of contents, a method of providing an audio sound of the selected content to the user is needed.

SUMMARY

Exemplary embodiments have been developed in order to overcome the above drawbacks and other problems associated with the arrangement of the related art. An aspect of an exemplary embodiment is to provide a glasses apparatus which can provide a user with an audio sound of a single content which he or she selects among a plurality of contents which a display apparatus is displaying. One or more exemplary embodiments may overcome the above disadvantages and other disadvantages not described above. However, it is understood that one or more exemplary embodiment is not required to overcome the disadvantages described above, and may not overcome any of the problems described above.

The above aspect and/or other aspects can be substantially achieved by providing a glasses apparatus which includes: a first interface module which receives a synchronization signal in a first wireless communication method; a glasses frame, a first glass and a second glass mounted on the glasses frame and which are driven in synchronization with one of a plurality of contents output on a display apparatus based on the synchronization signal; a second interface module which receives audio signals of at least one content from among the plurality of contents in a second wireless communication method; a controller which selects an audio signal of said one content from among the audio signals received by the second interface module; and an audio outputter which outputs the selected audio signal of said one content, wherein the audio outputter is integrally formed with the glasses frame.

The audio outputter may be installed inside the glasses frame.

The audio outputter may include an audio data processor which processes the audio signal to generate an audio sound; and an outputter which outputs the generated audio sound.

The glasses frame may include a glass mounting portion which holds the first glass and the second glass; and a wearing portion which is connected to the glass mounting portion and is worn by a user.

The outputter may include a first outputter which outputs the audio sound to a first ear of the user; and a second outputter which outputs the audio sound to a second ear of the user. The wearing portion may include a band portion connected to the glass mounting portion; a first holding portion which is connected to a first end of the band portion, which has a first outputter mounted therein, and which includes a first sound-emitting hole; and a second holding portion which is connected to a second end of the band portion, has a second outputter mounted therein, and which includes a second sound-emitting hole.

The audio data processor is provided inside one of the first and second holding portions.

The first holding portion and the second holding portion may be formed to slide on the band portion.

The first holding portion may include a first body connected to a first end of the band portion; and a first sound-emitting portion which is provided on the first body and includes the first sound-emitting hole. The second holding portion may include a second body connected to a second end of the band portion; and a second sound-emitting portion which is provided on the second body and includes the second sound-emitting hole.

The first outputter may be provided inside the first sound-emitting portion, and the second outputter may be provided inside the second sound-emitting portion.

The audio data processor may be positioned inside one of the first body and the second body.

Each of the first sound-emitting portion and the second sound-emitting portion may be formed integrally with the first body and the second body, respectively.

Each of the first sound-emitting portion and the second sound-emitting portion may be rotatably provided on the first body and the second body, respectively.

A rotation direction of each of the first sound-emitting portion and the second sound-emitting portion may be parallel to a side surface of a user when the user wears the glasses apparatus.

The first holding portion may include a first body connected to a first end of the band portion; a first connecting link provided on the first body; and a first inserting member which is provided on the first connecting link and comprises the first sound-emitting hole. The second holding portion may include a second body connected to a second end of the band portion; a second connecting link provided on the second body; and a second inserting member which is provided on the second connecting link and comprises the second sound-emitting hole.

Each of the first connecting link and the second connecting link may be rotatable on the first body and the second body, respectively.

A rotation direction of each of the first connecting link and the second connecting link may be parallel to a side surface of a user when the user wears the glasses apparatus.

Each of the first inserting member and the second inserting member may be rotatable on the first connecting link and the second connecting link, respectively.

A rotation axis of the first connecting link and a rotation axis of the first inserting member may be orthogonal to each other, and a rotation axis of the second connecting link and a rotation axis of the second inserting member may be orthogonal to each other.

Each of the first inserting member and the second inserting member may be formed to slide on the first connecting link and the second connecting link, respectively.

A sliding direction of each of the first inserting member and the second inserting member may be parallel to the rotation axis of the first inserting member and the second inserting member, respectively.

The outputter may include a first outputter which outputs the audio sound to a first ear of the user; and a second outputter which outputs the audio sound to a second ear of the user. The glasses frame may include a glass mounting portion which holds the first glass and the second glass; a band portion connected to the glass mounting portion; a first body connected to a first end of the band portion; a first sound-emitting portion which is connected to the first body using a first wire, which includes the first outputter mounted therein, and which is inserted into a first ear of the user; a second body connected to a second end of the band portion; and a second sound-emitting portion which is connected to the second body using a second wire, which includes the second outputter mounted therein, and which is inserted into a second ear of the user.

The first body includes a first receiving groove which receives the first sound-emitting portion. The second body includes a second receiving groove which receives the second sound-emitting portion.

The audio data processor may be provided inside one of the first body and the second body.

The audio outputter may include a rechargeable battery or a replaceable battery, which provides power to the outputter.

The second interface module may receive the audio sound by the second wireless communication method from the display apparatus, and the second wireless communication method may include one of a radio-frequency, a Bluetooth, a zigbee, and an infrared communication.

According to yet another aspect, there is provided an audio output apparatus including: an interface module which receives an audio signal for one of a plurality of contents from a display apparatus which operates in a multi-view mode to combine and output the plurality of contents; an audio data processor which processes the received audio signal to generate an audio sound; an outputter which outputs the audio sound; and a connecting portion which detachably attaches the audio output apparatus to a glasses apparatus.

According to yet another aspect, there is provided a glasses apparatus including: a glass frame; a first glass and a second glass mounted on the glass frame; an interface module which receives an audio data packet of each of a plurality of contents output by a display apparatus; and a controller which activates the interface module according to a timing at which an audio data packet of a content selected from the plurality of contents is received.

According to yet another aspect, there is provided a display apparatus including: a first video processor which processes a video data of a first content; a second video processor which processes a video data of a second content; a display which provides a plurality of contents views using the video data processed by the first video processor and the second video processor; a first audio processor which processes an audio data of the first content; a second audio processor which processes an audio data of the second content; a packetizer which packetizes the audio data processed by the first audio processor and the second audio processor; and a communicator which transmits a first audio data packet and a second audio data packet which are packetized by the packetizer.

With a glasses apparatus according to various exemplary embodiments, a user can listen to an audio sound of the content which he or she selects using the glasses apparatus.

Other aspects may become more apparent from the following detailed description of exemplary embodiments, taken in conjunction with the annexed drawings.

BRIEF DESCRIPTION OF THE DRAWINGS

These and/or other aspects will become more apparent and more readily appreciated from the following description of exemplary embodiments, taken in conjunction with the accompanying drawings, in which.

Throughout the drawings, like reference numerals will be understood to refer to analogous parts, components and structures.

DETAILED DESCRIPTION OF THE EXEMPLARY EMBODIMENTS

Hereinafter, certain exemplary embodiments will be described in detail with reference to the accompanying drawings. The matters defined herein, such as a detailed construction and elements thereof, are provided to assist in a comprehensive understanding of this description. Thus, it is apparent that exemplary embodiments may be carried out without those defined matters. Also, well-known functions or constructions are omitted to provide a clear and concise description of exemplary embodiments. Further, dimensions of various elements in the accompanying drawings may be arbitrarily increased or decreased for assisting in a comprehensive understanding.

Figure 1:
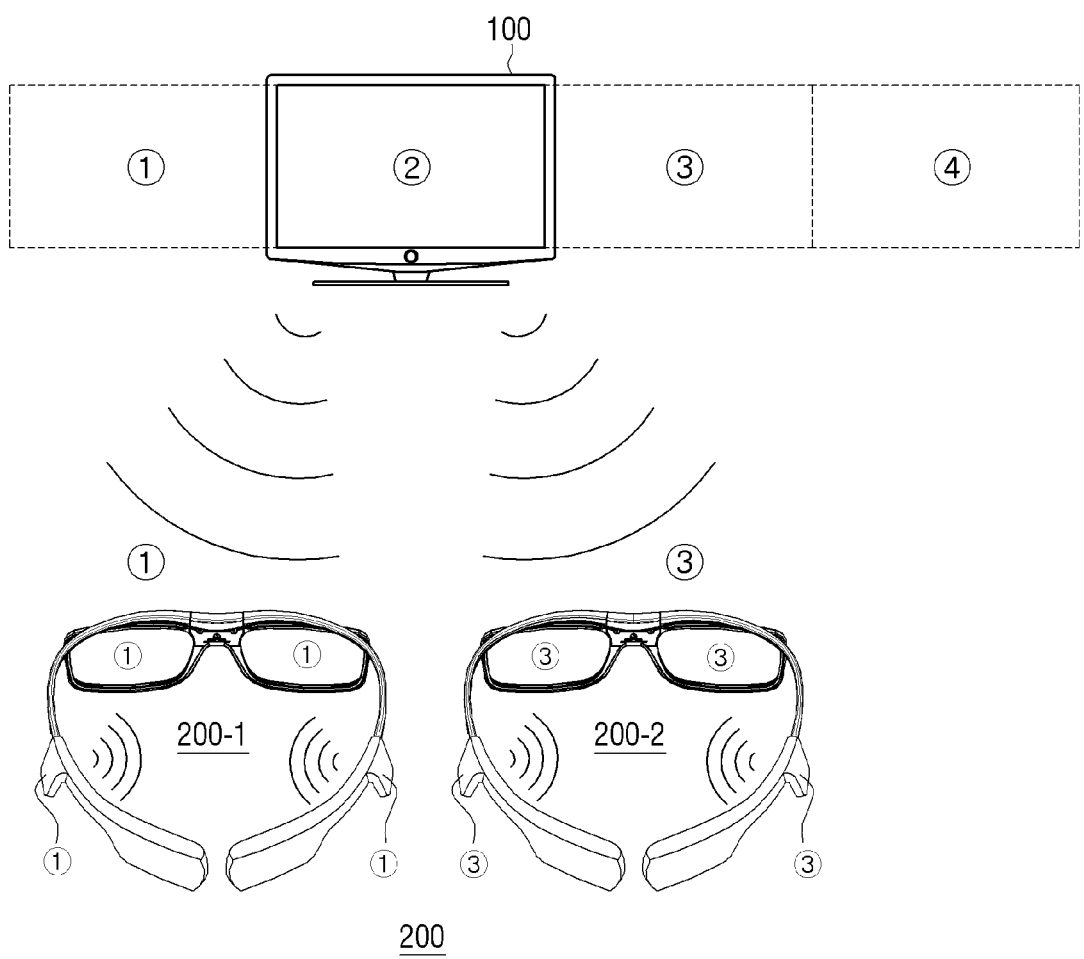
FIG. 1 is a schematic view illustrating a configuration of a content providing system according to a first exemplary embodiment.

FIG. 1 is a schematic view illustrating a configuration of a content providing system according to a first exemplary embodiment.

As illustrated in FIG. 1, the present system may include a display apparatus 100 and a glasses apparatus 200 (glasses apparatus 200-1, 200-2, etc) according to an exemplary embodiment.

The display apparatus 100 alternately displays a plurality of contents and sends a synchronization signal corresponding to a display timing of each of the plurality of contents to the glasses apparatus 200. Also, the display apparatus 100 outputs an audio signal of each of the contents to the glasses apparatuses 200 corresponding to the plurality of contents. The display apparatus 100 may be embodied by various apparatuses having a display, such as TVs, cell-phones, PDAs, notebook PCs, monitors, tablet PCs, electronic books, electronic picture frames, kiosks, etc.

The glasses apparatus 200 controls open timings of left and right eye shutter glasses depending on a synchronization signal received from the display apparatus 100. In other words, based on information included in the received synchronization signal, the glasses apparatus 200 opens the left and right eye shutter glasses while content is displayed, thereby allowing a user to watch video images with respect to a single content among the plurality of contents.

According to an exemplary embodiment the glasses apparatus 200 can open the left and right eye shutter glasses when content 1 is displayed among contents 1 to 4 which are alternately displayed based on the synchronization signal received from the display apparatus 100.

As described above, since the glasses apparatus 200 opens the left and right eye shutter glasses when the content 1 is displayed, the user who wears the glasses apparatus 200-1 can watch the video image with respect to the content 1 among the plurality of contents which is displayed on the display apparatus 100 through the glasses apparatus 200-1.

On the other hand, the display apparatus 100 which alternately displays the contents 1 to 4, outputs audio signals with respect to the contents 1 to 4 corresponding to timing when each of the contents 1 to 4 is displayed thereon. Accordingly, in the exemplary embodiment, as described above, the glasses apparatus 200-1 which opens the left and right eye shutter glasses when the content 1 is displayed can receive and output an audio signal of the content 1 which is output corresponding to the timing when the content 1 is displayed. Therefore, the user can watch the video image with respect to the content 1, and can at the same time listen to the audio sound with respect to the content 1 through the glasses apparatus 200-1, which he or she wears.

On the other hand, the other glasses apparatus 200-2 can open left and right eye shutter glasses when the content 3 is displayed among the contents 1 to 4 which are alternately displayed based on the synchronization signal received from the display apparatus 100. On the other hand, the display apparatus 100 which alternately displays the contents 1 to 4, outputs an audio signal with respect to each of the contents 1 to 4 corresponding to timing when each of the contents 1 to 4 is displayed thereon. Accordingly, the glasses apparatus 200-2 which opens the shutter glasses thereof when the content 3 is displayed can receive and output an audio signal of the content 3 which is output corresponding to the timing when the content 3 is displayed. Accordingly, the user can not only watch the video image with respect to the content 3 but can also listen to the audio with respect to the content 3 using the glasses apparatus 200-2, which he or she wears.

The user who is watching the video image with respect to one among the plurality of contents through the glasses apparatus 200 can manipulate input buttons which are provided with the glasses apparatus 200 which he or she wears to control the volume of the audio with respect to the content which he or she is now watching, and to change from a channel of the content which he or she is watching to another channel, or to watch content provided from external devices.

On the other hand, the above-described content may be a two-dimensional (2D) content or a three-dimensional (3D) content. The three-dimensional content is referred to content which uses multi-viewpoint images representing the same object from various different viewpoints for a user to feel a cubic effect.

So far, the system which includes the display apparatus 100 to provide the plurality of contents and the glasses apparatus 200 for watching the plurality of contents provided by the display apparatus 100 has been described.

However, the present disclosure is not limited by the above-description of exemplary embodiments. The present disclosure can apply to polarized glass type (or passive type) display apparatuses.

The polarized glass type display apparatus divides each frame of a plurality of contents on a line basis, and forms a single frame by combining the lines. For example, if two contents are used, the polarized glass type display apparatus divides a frame of a first content into a plurality of first lines and divides a frame of a second content into a plurality of second lines. The polarized glass type display apparatus generates a first frame by combining odd-numbered lines of the first lines and even-numbered lines of the second lines, and generates a second frame by combining even-numbered lines of the first lines and odd-numbered lines of the second lines. The polarized glass type display apparatus displays the first frame and the second frame in sequence. The polarized glass type display apparatus adjusts a polarization direction of each line using a lenticular lens or a parallax barrier. Accordingly, a user can watch the odd-numbered lines of the first frame and the even-numbered lines of the second frame using a first glasses apparatus in which a left eye glass and a right eye glass are realized in a first polarization direction, and can watch the even-numbered line of the first frame and the odd-numbered line of the second frame through a second glasses apparatus in which a left eye glass and a right eye glass are realized in a second polarization direction perpendicular to the first polarization direction.

The glasses apparatus which operates in conjunction with the polarized glass type display apparatus may not include an active shutter glass, a shutter glass driver, and a first communicator. Specifically, a glasses apparatus which is used in a polarized type system may include first and second glasses, a glasses frame on which the glasses are mounted, an interface module which receives audio signals of the contents, a buffer which temporarily stores the audio signals of at least one content received by the interface module, a controller which selects an audio signal of one content from among the audio signals stored in the buffer, and an audio outputter which outputs the audio signal of the content selected by the controller. The interface module may receive the audio signals in various communication methods. For example, an RF wireless communication module may be used. The audio outputter may be integrally formed with the glasses frame. Various forms in which the audio outputter is disposed on the glasses frame will be explained below in detail with the reference to the drawings.

As described above, the polarized glass type display apparatus displays each content on a single screen, line by line simultaneously. In this case, the glasses apparatus may use a polarized glasses apparatus and each of a plurality of users can watch a video image of each content through the polarized glasses apparatus that he/she wears. As described above, since each polarized glasses apparatus has an audio module embedded therein, the user wearing the glasses apparatus can watch and listen to video images and audio sounds of a specific content even using the passive type glasses apparatus.

Further, the present disclosure is not limited to the multi-view mode. Exemplary embodiments can be applied to a single view mode (to watch a single content), especially to a case when three-dimensional content is watched in the single view mode.

Hereinafter, an audio module of the glasses apparatus according to a first exemplary embodiment will be explained.

Figure 2:
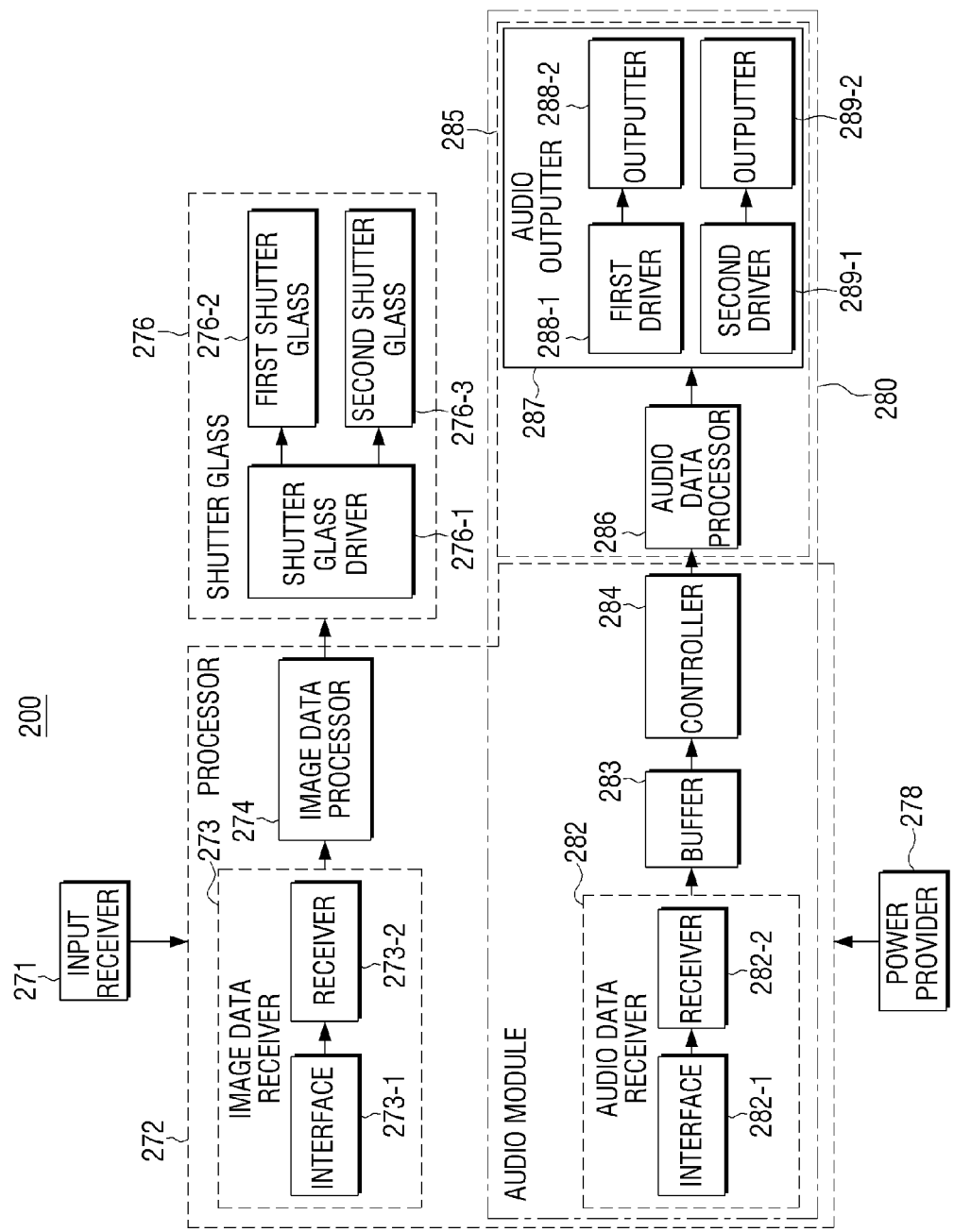
FIG. 2 is a block diagram illustrating a glasses apparatus according to a first exemplary embodiment.

FIG. 2 is a block diagram for illustrating the glasses apparatus according to the first exemplary embodiment. Referring to FIG. 2, the glasses apparatus 200 as illustrated in FIG. 2 works in conjunction with the display apparatus 100 (see FIG. 1, not shown in FIG. 2) which works in a multi-view mode to combine and output a plurality of contents, and includes an input receiver 271, a processor 272, a shutter glass 276, a power provider 278, and an audio module 280.

The input receiver 271 can receive a variety of user commands.

Specifically, the input receiver 271 can receive a power on-off command of the glasses apparatus 200, a paring command for performing a paring with the display apparatus 100 (FIG. 1), a content-view changing command, a mode setting command for setting a private mode or a public mode, a 3D mode or a dual-view mode setting command, an adjusting command for adjusting an audio volume of the glasses apparatus 200, etc.

For example, the input receiver 271 may be implemented in the form of at least one of touch sensors, operating buttons, and slide switches.

The processor 272 includes an image data receiver 273, an image data processor 274, and an audio data receiver 282, a buffer 283, a controller 284, and an audio data processor 286 which constitute an audio module 280. The audio data receiver 282, the buffer 283, the controller 284, and the audio data processor 286 will be described in detail when the audio module 280 is described in detail below. The second interface module 282, the buffer 283, and the controller 284 may not be included in the audio module 280 and may be provided in the glasses apparatus 200 separately.

The image data receiver 273 can receive a synchronization signal of image data of one among the plurality of contents from the display apparatus which works in the multi-view mode to combine and output the plurality of contents. For this, the image data receiver 273 may include an interface 273-1 and a receiver 273-2.

The interface 273-1 receives the synchronization signal from the display apparatus.

For example, when the interface 273-1 is implemented in form of a blue-tooth communication module, the interface 273-1 can perform communication with the display apparatus 100 (FIG. 1) based on a bluetooth communication standard and can receive a transmission stream including the synchronization signal. In this case, the transmission stream includes time information to turn on or off a first shutter glass 276-2 and a second shutter glass 276-3 of the glasses apparatus 200 to synchronize to a display timing of each of contents. The glasses apparatus 200 can turn on or off the shutter glass based on the display timing corresponding to itself.

On the other hand, the interface 273-1 may be implemented in an IR receiving module and may receive a synchronization signal in form of infrared having a specific frequency. In this case, the synchronization signal includes time information to turn on or off the first shutter glass 276-2 and the second shutter glass 276-3 of the glasses apparatus 200 to be synchronized to a display timing of one of the plurality of contents. Also, the interface 273-1 sequentially receives IR synchronization signals having different frequencies if the switching mode is started, and if the switching mode is ended, can receive an IR synchronization signal which is being received at the ending time of the mode.

On the other hand, the interface 273-1 can receive information with respect to image frame rates and image frame periods of each of the contents from the display apparatus 100, as illustrated in FIG. 1 in an exemplary embodiment.

The receiver 273-2 receives the synchronization signal of image data from the display apparatus through a communication between the interface 273-1 and the display apparatus.

The image data processor 274 transmits the synchronization signal received by the receiver 273-2 to a shutter glass driver 276-1 to control the behavior of the shutter glass driver 276-1. In other words, the image data processor 274, based on the synchronization signal, controls the shutter glass driver 276-1 to generate a driving signal for driving the first shutter glass 276-2 and the second shutter glass 276-3.

The shutter glass 276 includes the shutter glass driver 276-1, the first shutter glass 276-2, and the second shutter glass 276-3.

The shutter glass driver 276-1 generates a driving signal based on the synchronization signal received from the image data processor 274. Especially, the shutter glass driver 276-1, based on the synchronization signal, can open the first shutter glass 276-2 and the second shutter glass 276-3 according to a display timing of one of the plurality of contents being displayed on the display apparatus 100, as illustrated in FIG. 1.

The first shutter glass 276-2 and the second shutter glass 276-3 can be turned on/off based on the driving signal which is received from the shutter glass driver 276-1. Specifically, the first shutter glass 276-2 and the second shutter glass 276-3 at the same time open the shutter glasses when one of the plurality of contents is displayed thereon, and turn off all the shutter glasses when the other contents are displayed. Therefore, the user wearing the glasses apparatus 200 can watch only a single content.

On the other hand, in a case of three-dimensional contents, the first shutter glass 276-2 and the second shutter glass 276-3 can alternately open and close. In other words, based on the driving signal, the first shutter glass 276-2 can be opened at a time when a left eye image configuring a 3D content is displayed, and the second shutter glass 276-3 can be opened at a timing when a right eye image thereof is displayed.

The power provider 278 supplies electric power to the glasses apparatus 200, and can be disposed inside (or built into) the glasses apparatus 200 as a separate battery. The battery can be provided in the form of a rechargeable type or a replaceable type. Also, the glasses apparatus 200 may include connectors such as a USB port, etc. for recharging the power provider 278 from an external power source.

The audio module 280 includes the audio data receiver 282, the buffer 283, the controller 284, an audio outputter 285, and an audio data processor 286. As described above, by way of an example, the audio data receiver 282, the buffer 283, and the controller 284 may not be included in the audio module 280.

The audio data receiver 282 may receive an audio data corresponding to the plurality of contents from the display apparatus which works in the multi-view mode to combine and output the plurality of contents.

The audio data receiver 282 may include an interface 282-1 and a receiver 282-2. The interface 282-1 performs communication with the display apparatus. The interface 282-1 may be implemented in form of an RF communication module. In this case, the interface 282-1 may include a tuner. The receiver 282-2 may include a demodulator, an equalizer, and etc. to process RF signals received through the interface 282-1. The interface 282-1 of the audio data receiver 282 may be implemented in form of a blue-tooth communication module. In this case, the interface 282-1 can receive the synchronization signal of the audio data through blue-tooth communication with the display apparatus. In addition to the bluetooth communication method, the interface 282-1 can use communication methods such as zigbee communication, infrared communication, etc. Further, the interface 282-1 can communicate with the display apparatus by a variety of wireless communication methods which form a communication channel at a close range and can send and receive a signal. Also, the interface 282-1 can communicate with the display apparatus by a wire communication method. On the other hand, the interface 282-1 can be formed integrally with the interface 273-1 of the image data receiver 273.

The receiver 282-2 receives various signals from the display apparatus if the interface 282-1 is connected to the display apparatus. Specifically, the receiver 282-2 may receive signals including an audio data.

As described above, the audio data receiver 282 may receive an audio signal corresponding to at least one content from among the plurality of contents according to an exemplary embodiment.

The buffer 283 temporarily stores the audio signal received by the audio data receiver 282.

The controller 284 selectively provides the audio signal stored in the buffer 283 to a processor to process audio data, which is then provided to an audio outputter 285. Although FIG. 2 illustrates the audio signal being provided to the audio outputter 285 through the controller 284, an actual data may be directly provided to the audio outputter 285 without the controller 284 and/or the processor or may be provided to the audio outputter 285 through a separate data bus.

The audio outputter 285 includes an audio data processor 286 and an outputter 287.

The audio data processor 286 processes the received audio data and generates an audio sound. Specifically, the audio data processor 286 may perform an audio signal processing such as audio decoding, noise filtering, and amplification.

The outputter 287 is an element that outputs the audio sound generated by the audio data processor 286. The outputter 287 may include first and second drivers 288-1 and 289-1 and first and second outputters 288-2 and 289-2. The first driver 288-1 can drive the first outputter 288-2, and the second driver 289-1 can drive the second outputter 289-2.

The first and second outputters 288-2 and 289-2 correspond to both ears of the user, respectively. For example, the first outputter 288-2 outputs the audio sound to the user's left ear, and the second outputter 289-2 outputs the audio sound to the user's right ear or vice versa.

Exemplary operations of transmitting and receiving the audio data and a detailed operations of an exemplary process will be explained in detail below according to an exemplary embodiment.

In addition, the glasses apparatus 200 according to an exemplary embodiment may include a controller although not illustrated, and the controller may control the overall behaviors of the glasses apparatus 200.

Figure 3:
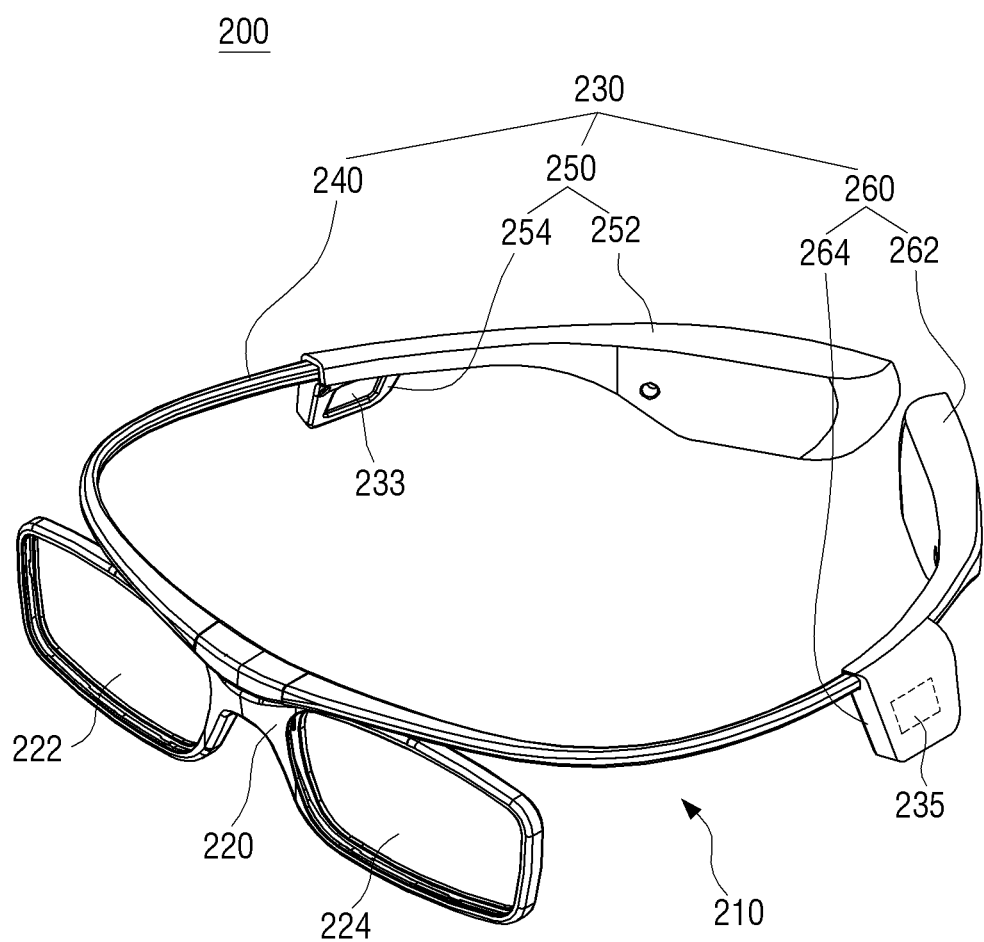
FIG. 3 is a perspective view schematically illustrating a glasses apparatus according to a first exemplary embodiment.
Figure 4:
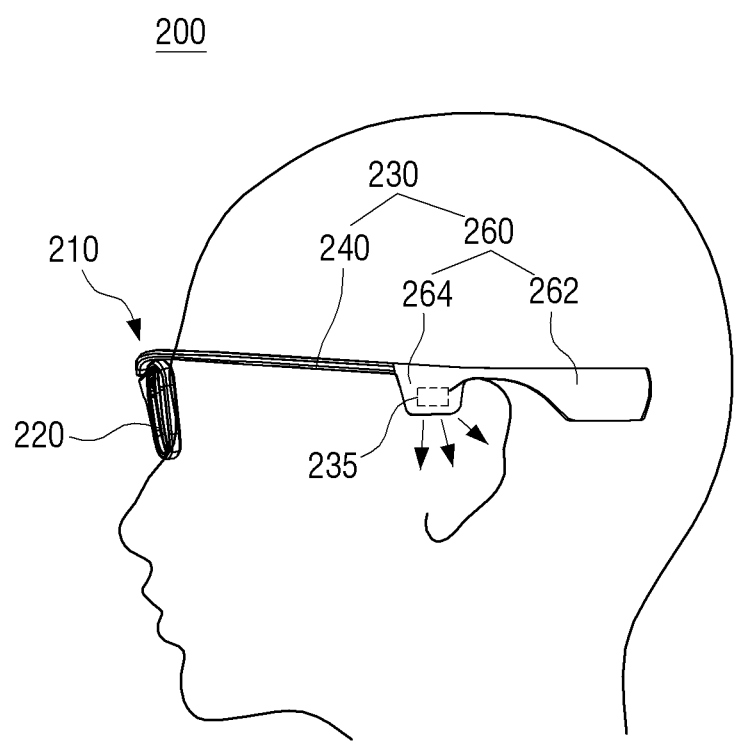
FIG. 4 is a view schematically illustrating a glasses apparatus according to a first exemplary embodiment.

FIG. 3 is a perspective view schematically illustrating a glasses apparatus according to a first exemplary embodiment. FIG. 4 is a view schematically illustrating a glasses apparatus according to a first exemplary embodiment.

Referring to FIGS. 3 and 4, the glasses apparatus 200 includes first and second glasses 222 and 224, a glasses frame 210, and the above-described exemplary audio module 280 (see FIG. 2, not shown in FIGS. 3 and 4).

The first and second glasses 222 and 224 are driven according to synchronization signals, and transmit light corresponding to a video image of a selected content among the plurality of contents toward the user's eyes. The first and second glasses 222 and 224 are turned on and turned off simultaneously. Accordingly, the user can watch the video image of the selected content through the first and second glasses 222 and 224. In an exemplary embodiment, the first and second glasses 222 and 224 are illustrated in a substantially rectangular shape; however, they can have a different shape such as a circle, an oval, a triangle, a star, and etc.

The glasses frame 210 forms an overall appearance of the glasses apparatus 200 and is similar to a shape of a general rim of a pair of glasses.

The glasses frame 210 includes a glass mounting portion 220 and a wearing portion 230.

On the glass mounting portion 220 are mounted the first and second glasses 222 and 224, as described above by way of an example.

The wearing portion 230 includes a band portion 240, a first holding portion 250, and a second holding portion 260.

The band portion 240 has a substantially semi-circular ring shape to wrap around a head of the user when he or she is wearing it, and is connected to the glass mounting portion 220 on a bottom side of the front side thereof.

The first holding portion 250 is connected to a first end of the band portion 240, and the second holding portion 260 is connected to a second end of the band portion 240. So the first and second holding portions 250 and 260 support the side and rear of the user's head when wearing the glasses apparatus 200.

The first holding portion 250 includes a first body 252 connected to the first end of the band portion 240 and a first sound-emitting portion 254 which is mounted to the first body 252 and has a first sound-emitting hole 233.

The second holding portion 260 includes a second body 262 connected to the second end of the band portion 240 and a second sound-emitting portion 264 which is mounted to the second body 262 and has a second sound-emitting hole 235.

Each of the first and second sound-emitting portions 254 and 264 is formed integrally with each of the first and second bodies 252 and 262, respectively. However, as alternative exemplary embodiments, each of the first and second sound-emitting portions 254 and 264 may be formed separately from each of the first and second bodies 252 and 262.

Each of the first and second sound-emitting portions 254 and 264 is formed to project downward from each of the first and second bodies 252 and 262, respectively, and to be inclined in an outward direction from the glasses apparatus 200. Accordingly, when the user wears the glasses apparatus 200, the first and second sound-emitting portions 254 and 264 can mainly send the audio sound toward the user's auricles through the first and second sound-emitting holes 233 and 235, respectively.

When wearing the glasses apparatus 200, the first and second sound-emitting portions 254 and 264 are arranged at positions corresponding to the user's both ears. Therefore, the user can hear the audio sound of the selected content emitted through the first and second sound-emitting holes 233 and 235 of the first and second sound-emitting portions 254 and 264.

The audio module 280 (see FIG. 2) includes the audio data receiver 282, the buffer 283, the controller 284, and the audio outputter 285, example of which is described above.

The audio module 280 is formed integrally with the glasses frame 210 of the glasses apparatus 200. In detail, the audio module 280 is installed entirely inside (or built in) the glasses frame 210 of the glasses apparatus 200. In other words, the audio data receiver 282, the buffer 283, the controller 284, and the audio outputter 285 constituting the audio module 280 are disposed inside or built into the glasses frame 210.

In an exemplary embodiment, the first outputter 288-2 of the outputter 287 is installed within (or built in) the first sound-emitting portion 254, the second outputter 289-2 of the outputter 287 is installed within (or built in) the second sound-emitting portion 264, and the audio data receiver 282, the buffer 283, the controller 284, and the audio outputter 285 may be installed within (or built in) one of the first and second bodies 252 and 262. Alternatively, the audio data receiver 282, the buffer 283, the controller 284, and the audio outputter 285 may be disposed within each of the first and second sound-emitting portions 254 and 264.

Hereinafter, a glasses apparatus according to a second exemplary embodiment will be described.

Figure 5:
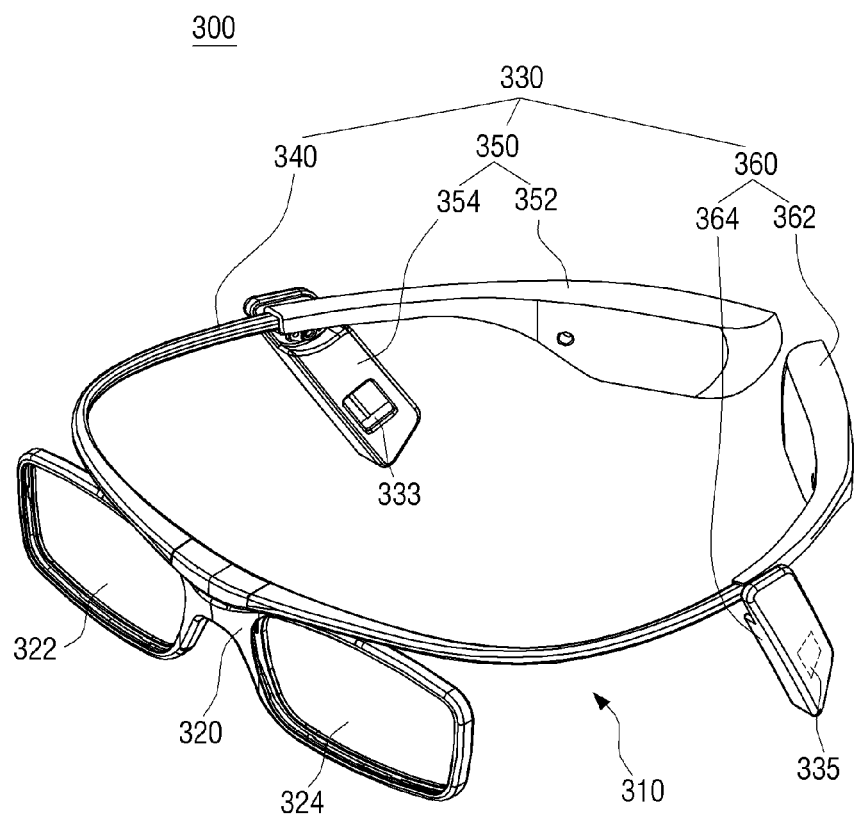
FIG. 5 is a perspective view schematically illustrating a glasses apparatus according to a second exemplary embodiment.
Figure 6:
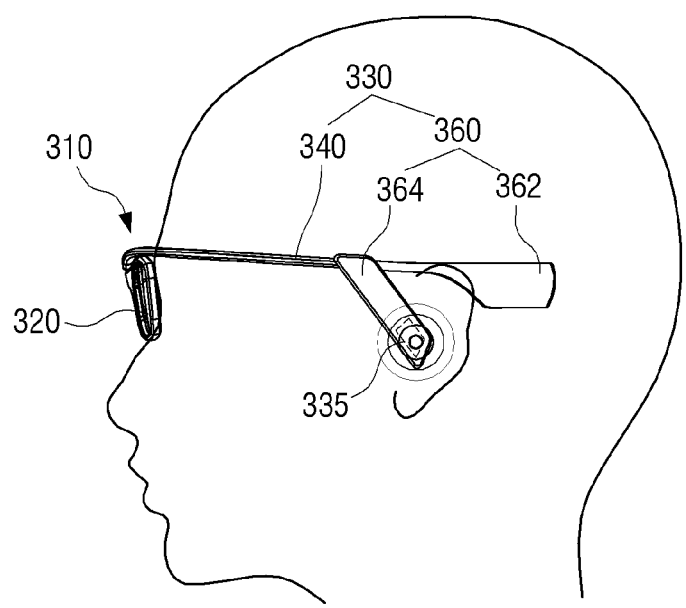
FIG. 6 is a view schematically illustrating a glasses apparatus according to a second exemplary embodiment.
Figure 7:
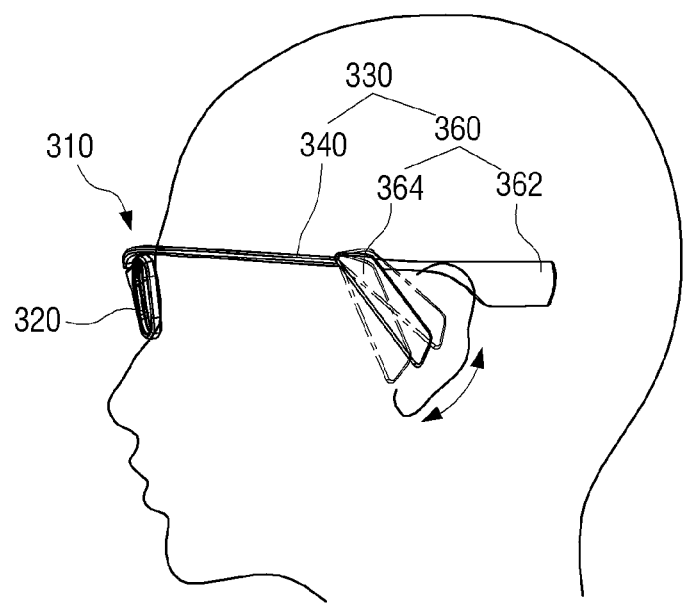
FIG. 7 is a view schematically illustrating a motion of a glasses apparatus according to a second exemplary embodiment.

FIG. 5 is a perspective view schematically illustrating a glasses apparatus according to a second exemplary embodiment. FIG. 6 is a view schematically illustrating a glasses apparatus according to a second embodiment. FIG. 7 is a view schematically illustrating motion of a glasses apparatus according to a second exemplary embodiment.

The glasses apparatus 300 according to a second exemplary embodiment is somewhat similar to the glasses apparatus 200 according to the above-described exemplary embodiment. Therefore, somewhat similar configurations are not repeatedly explained and difference thereof will be mainly explained.

The glasses apparatus 300 according to an exemplary embodiment includes first and second glasses 322 and 324, a glasses frame 310, and the above-described audio module 280 (see FIG. 2).

Exemplary configuration and operations of the first and second glasses 322 and 324 are analogous as in the above-described exemplary embodiments, and thus an analogous explanation is omitted to avoid redundancy.

The glasses frame 310 includes a glass mounting portion 320 and a wearing portion 330.

The wearing portion 330 includes a band portion 340 connected with the glass mounting portion 320, a first holding portion 350 connected with a first end of the band portion 340, and a second holding portion 360 connected with a second end of the band portion 340.

The first holding portion 350 includes a first body 352 and a first sound-emitting portion 354. The second holding portion 360 includes a second body 362 and a second sound-emitting portion 364.

The first and second sound-emitting portions 354 and 364 include first and second sound-emitting holes 333 and 335, respectively.

The first and second sound-emitting portions 354 and 364 are rotatably mounted onto the first and second bodies 352 and 362, respectively. A rotation direction of each of the first and second sound-emitting portions 354 and 364 is parallel to a side surface of the user's head when the user wears the glasses apparatus 300. A side of an upper portion of each of the first and second sound-emitting portions 354 and 364 is connected to each of the first and second bodies 352 and 362, respectively, with a rotatable structure with respect to each of the first and second bodies 352 and 362, for example, a hinge structure so that each of the first and second sound-emitting portions 354 and 364 can rotate with respect to each of the first and second bodies 352 and 362.

The glasses apparatus 300 according to an exemplary embodiment, as illustrated in FIG. 7, has the second sound-emitting portion 364 which can be rotated in arrow direction. Accordingly, when wearing the glasses apparatus 300 according to an exemplary embodiment, the user can adjust the position of the second sound-emitting portion 364 based on a position of his or her ear so that the audio sound is clearly audible. Although not illustrated in the drawings, the position of the first sound-emitting portion 354 can also be adjusted by rotation in somewhat analogous manner to what is shown with respect to the second sound-emitting portion 364 in FIG. 7.

In a second exemplary embodiment, the first and second sound-emitting portions 354 and 364 may be formed to have a length longer than those of the first and second sound-emitting portions 254 and 264 of the first exemplary embodiment. The length of the first and second sound-emitting portions 354 and 364 is sufficient so that when the glasses apparatus 300 is worn, the first and second sound-emitting holes 333 and 335 are arranged at positions corresponding to the user's ear holes.

The audio module 280 (see FIG. 2) includes the audio data receiver 282, the buffer 283, the controller 284, and the audio outputter 285, analogous to the ones described above with reference to FIG. 2.

The audio module 280 is disposed integrally with the glasses frame 310 of the glasses apparatus 300. More specifically, the audio module 280 is installed entirely inside (or built in) the glasses frame 310 of the glasses apparatus 300. In other words, all the audio data receiver 282, the buffer 283, the controller 284, and the audio outputter 285 forming the exemplary audio module 280 are disposed inside (built in) the glasses frame 310.

In an exemplary embodiment, the first outputter 288-2 of the outputter 287 is installed within the first sound-emitting portion 354, the second outputter 289-2 of the outputter 287 is installed within the second sound-emitting portion 364, and the audio output receiver 282, the buffer 283, the controller 284, and the audio outputter 285 may be installed within or built in one of the first and second bodies 352 and 362. Alternatively, in an exemplary embodiment, the audio data receiver 282, the buffer 283, the controller 284, and the audio outputter 285 may be disposed within each of the first and second sound-emitting portions 354 and 364.

If the user wears the glasses apparatus 300 according to an exemplary embodiment, the first and second sound-emitting holes 333 and 335 thereof are arranged adjacent to the user's ear holes. Therefore, when multiple users watch multi-view from the display apparatus, each of the multiple users is undisturbed by the audio sounds emitted from the other users' contents and can instead clearly hear the audio sound of the content which he or she is watching without interference from the audio sounds emitted by the contents of other users.

Hereinafter, a glasses apparatus according to a third exemplary embodiment will be explained.

Figure 8:
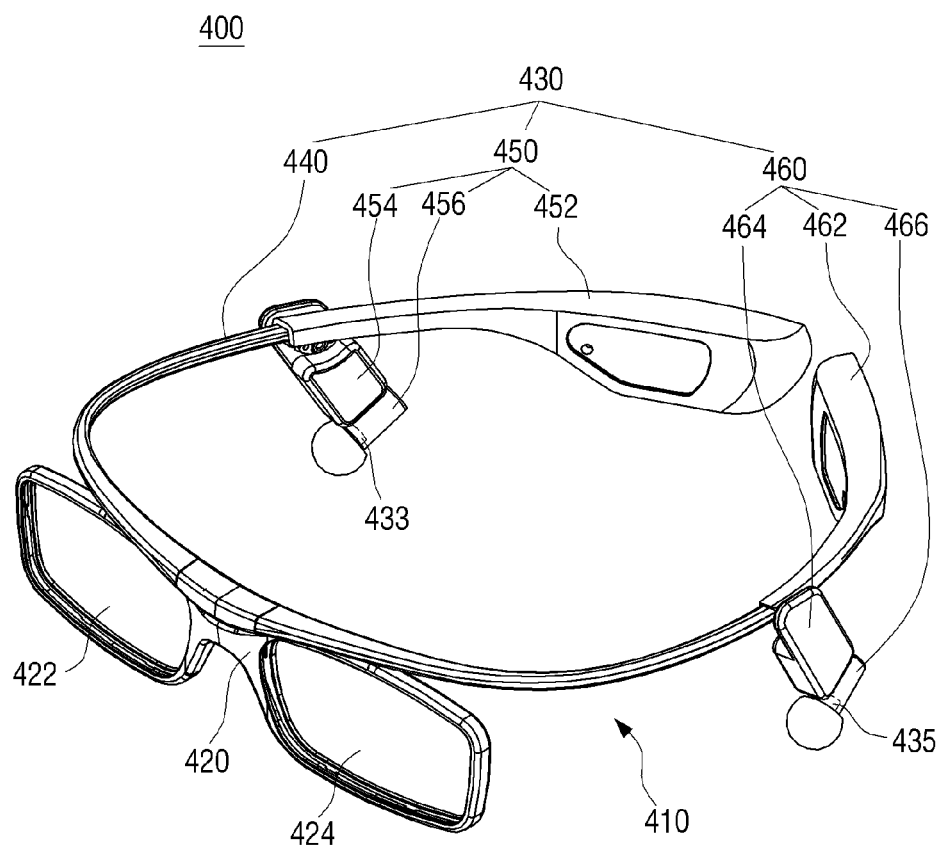
FIG. 8 is a perspective view schematically illustrating a glasses apparatus according to a third exemplary embodiment.

FIG. 8 is a perspective view schematically illustrating a glasses apparatus according to a third exemplary embodiment. FIGS. 9 to 12 are views schematically illustrating a motion of a glasses apparatus according to a third exemplary embodiment.

The glasses apparatus 400 according to a third exemplary embodiment is somewhat similar to the glasses apparatus 200 according to the above-described exemplary first embodiment. Therefore, somewhat similar configurations are not repeatedly explained to avoid redundancy. Instead, difference thereof will be mainly explained.

The glasses apparatus 400 includes first and second glasses 422 and 424, a glasses frame 410, and the above-described audio module 280 (see FIG. 2).

Configuration and operation of the first and second glasses 422 and 424 are somewhat analogous to operations of the first and second glasses 422 and 424 described above in exemplary embodiments, and thus an overlapped explanation is omitted to avoid redundancy.

The glasses frame 410 includes a glass mounting portion 420 and a wearing portion 430.

The above-described first and second glasses 422 and 424 are mounted onto the glass mounting portion 420 according to an exemplary embodiment.

The wearing portion 430 includes a band portion 440, a first holding portion 450, and a second holding portion 460.

The band portion 440 has a substantially semi-circular ring shape to wrap around the user's head when he or she is wearing it, and is connected to the glass mounting portion 420 on a bottom side of the front side thereof.

The first holding portion 450 includes a first body 452 connected to a first end of the band portion 440, a first connecting link 454 mounted onto the first body 452, and a first inserting member 456 which is disposed on the first connecting link 454 and has a first sound-emitting hole 433.

The second holding portion 460 includes a second body 462 connected to a second end of the band portion 440, a second connecting link 464 mounted onto the second body 462, and a second inserting member 466 which is disposed on the second connecting link 464 and has a second sound-emitting hole 435.

The first and second connecting links 454 and 464 are rotatably disposed on the first and second bodies 452 and 462, respectively. A direction of rotation of each of the first and second connecting links 454 and 464 may be parallel to a side surface of the user's head when the user wears the glasses apparatus 400.

The first and second inserting members 456 and 466 are disposed rotatably with respect to the first and second connecting links 454 and 464, respectively. Here, a rotation axis of the first connecting link 454 and a rotation axis of the first inserting member 456 are orthogonal to each other, and a rotation axis of the second connecting link 464 and a rotation axis of the second inserting member 466 are orthogonal to each other. In other words, a rotation direction of each of the first and second inserting members 456 and 466 is parallel to the front and rear surfaces of the user's head when the user wears the glasses apparatus 400.

Figure 12:
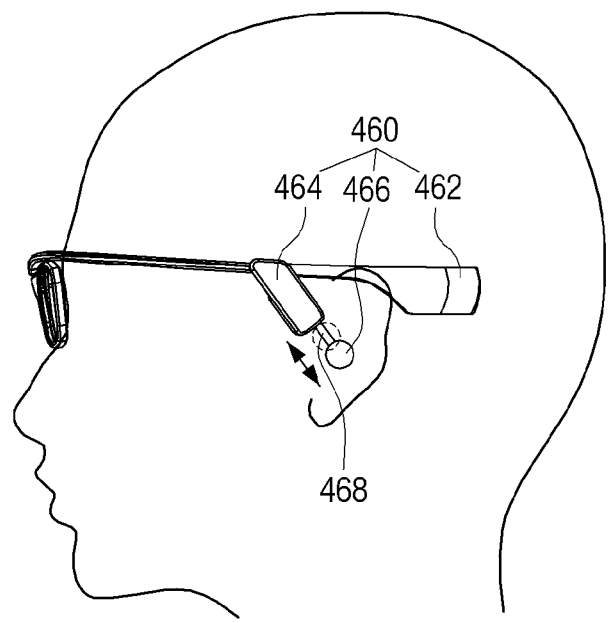

The first and second inserting members 456 and 466 are mounted slidably with respect to the first and second connecting links 454 and 464, respectively. A sliding direction of each of the first and second inserting members 456 and 466 is parallel to the rotation axes of the first and second inserting members 456 and 466. Each of the first and second inserting members 456 and 466 can be slid by a sliding member 468 as illustrated in FIG. 12.

Figure 9:
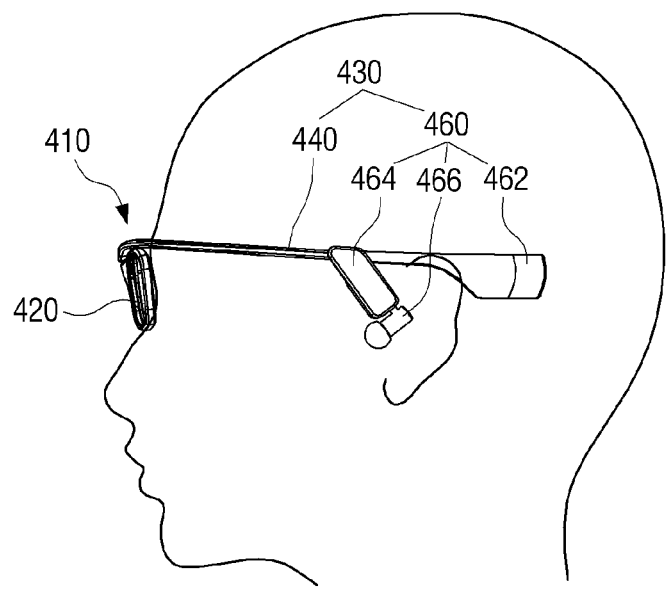
FIGS. 9 to 12 are views schematically illustrating a motion of a glasses apparatus according to a third exemplary embodiment.
Figure 10:
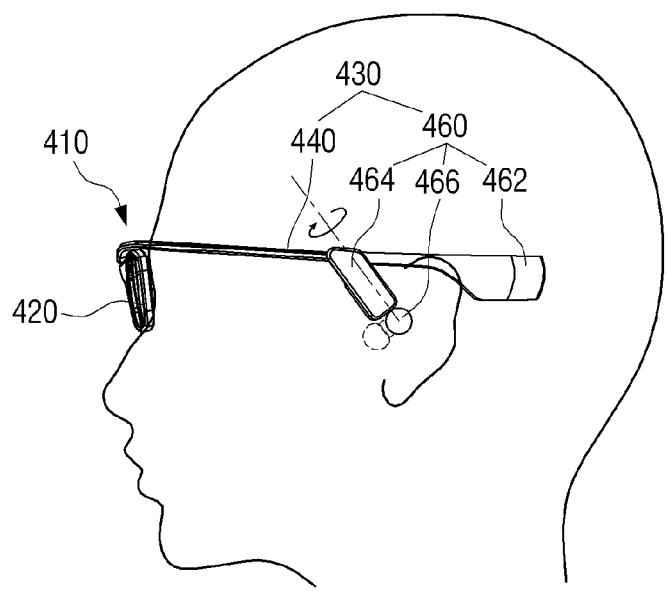
Figure 11:
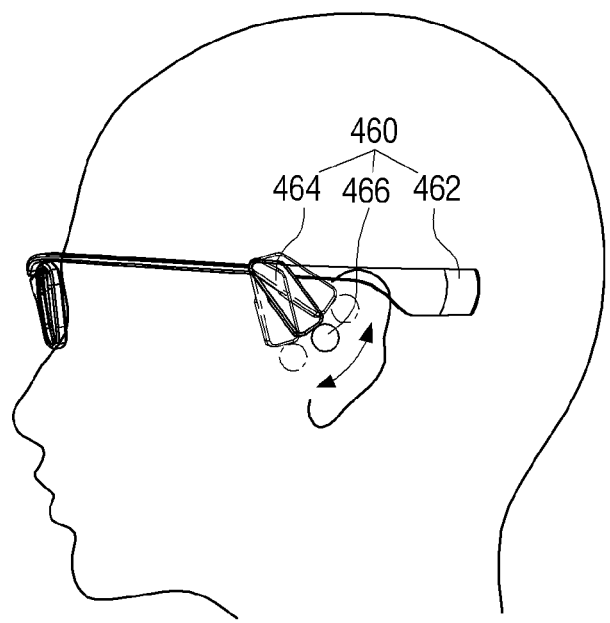

As illustrated in FIGS. 9 and 10, the second inserting member 466 of the glasses apparatus 400 can be rotated toward the ear hole of the user. FIG. 10 illustrates the second inserting member 466 rotated toward the user's ear hole. FIG. 11 illustrates rotation of the second connecting link 464. The second connecting link 464 can be rotated in an arrow direction. FIG. 12 illustrates a sliding motion of the second inserting member 466. The second inserting member 466 can be slid in an arrow direction by the sliding member 468. The user can position the first and second inserting members 456 and 466 where he or she wants by rotating and sliding motions of the above-described components and can thus listen to the audio sound clearly. The rotation and sliding motions thereof may be randomly performed depending on the user's needs. Also, the manipulation order thereof may be done randomly depending on the user's needs.

The first and second inserting members 456 and 466 are inserted into the user's ear holes when the glasses apparatus 400 is worn. This is somewhat similar to listening to audio sounds by using earphones, etc. Therefore, with the glasses apparatus 400 according to a third exemplary embodiment, the user is undisturbed by the other users who may also be listening to different contents and can clearly hear the audio sound emitted from the glasses apparatus 400. Also it is less likely that the audio sound of the user interferes and/or disturbs other users.

The audio module 280 (see FIG. 2) includes the audio data receiver 282, the buffer 283, the controller 284, and the audio outputter 285, as described above, by way of an example.

The audio module 280 is formed integrally with the glasses frame 410 of the glasses apparatus 400. More specifically, the audio module 280 is installed entirely inside (or built in) the glasses frame 410 of the glasses apparatus 400. In other words, the audio data receiver 282, the buffer 283, the controller 284, and the audio outputter 285, exemplary elements of the audio module 280 are disposed inside or built into the glasses frame 410.

In the third exemplary embodiment, the first outputter 288-2 of the outputter 287 is installed inside the first connecting link 454, the second outputter 289-2 of the outputter 287 is installed inside the second connecting link 464, and the audio data receiver 282, the buffer 283, the controller 284, and the audio outputter 285 may be installed inside one of the first and second bodies 452 and 462. Alternatively, the audio data receiver 282, the buffer 283, the controller 284, and the audio outputter 285 may be disposed within each of the first and second connecting links 454 and 464.

Hereinafter, a glasses apparatus according to a fourth exemplary embodiment will be explained.

Figure 13:
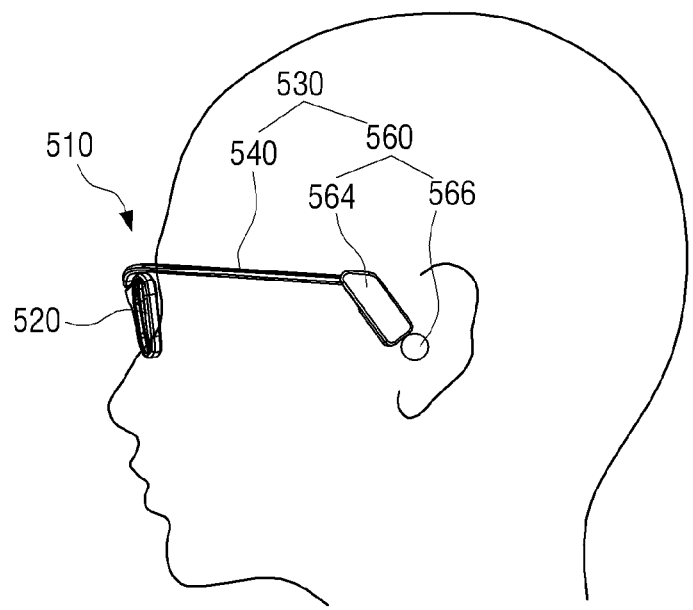
FIG. 13 is a view schematically illustrating a glasses apparatus according to a fourth exemplary embodiment.
Figure 14:
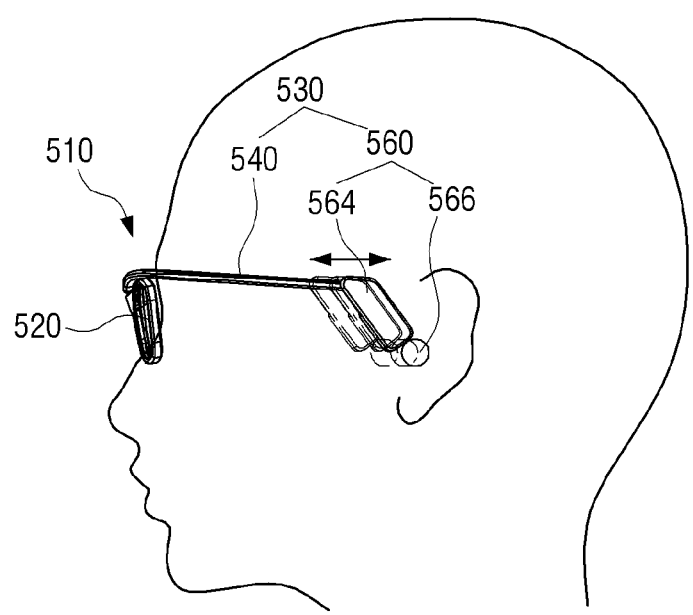
FIG. 14 is a view schematically illustrating a motion of a glasses apparatus according to a fourth embodiment of the present disclosure.

FIG. 13 is a view schematically illustrating a glasses apparatus according to a fourth exemplary embodiment. FIG. 14 is a view schematically illustrating a motion of a glasses apparatus according to a fourth exemplary embodiment.

The glasses apparatus 500 according to a fourth exemplary embodiment is similar to the glasses apparatus 200 according to the above-described exemplary embodiment. Therefore, analogous configurations are not repeatedly explained and only differences thereof will be mainly explained.

FIGS. 13 and 14 illustrate only one side surface of the glasses apparatus 500. The opposite side surface which is not illustrated in the drawings is formed in a shape corresponding to the side surface illustrated in the drawings in the above-described exemplary embodiments.

Referring to FIGS. 13 and 14, the glasses apparatus 500 according to the fourth exemplary embodiment includes first and second glasses, a glasses frame 510, and the above-described audio module 280 (see FIG. 2).

Exemplary configuration and operations of the first and second glasses are somewhat similar to the ones described in the above-described exemplary embodiments, and thus redundant explanation is omitted.

The glasses frame 510 includes a glass mounting portion 520 and a wearing portion 530.

The wearing portion 530 includes a band portion 540, first and second holding portions 560.

The first and second holding portions 560 are mounted slidably with respect to the band portion 540. The user can adjust a position of the glasses apparatus 500 by sliding the first and second holding portions 560.

The first and second holding portions 560 include first and second sound-emitting portions 564, and first and second inserting members 566.

The first and second inserting members 566 are disposed on the bottom side of the first and second sound-emitting portions 564, and are formed to project in a direction in which they are directly inserted into the user's ear holes when the glasses apparatus 500 is worn.

With the glasses apparatus 500 according to the fourth exemplary embodiment, when the user wear the glasses apparatus 500, the glass mounting portion 520 is fixed to the ridge of the nose of the user, and the first and second inserting members 566 are inserted into the user's ear holes. In other words, the glasses apparatus 500 according to the fourth exemplary embodiment is formed in a form similar to a stethoscope.

The audio module 280 (see FIG. 2) includes the audio data receiver 282, the buffer 283, the controller 284, and the audio outputter 285, somewhat analogous to the ones described above with reference to other exemplary embodiments.

The audio module 280 is formed integrally with the glasses frame 510 of the glasses apparatus 500. More specifically, the audio module 280 is installed entirely inside (or built in) the glasses frame 510 of the glasses apparatus 500. In other words, all the audio data receiver 282, the buffer 283, the controller 284, and the audio outputter 285, exemplary elements of the audio module 280 are disposed inside (or built into) the glasses frame 510.

In the fourth exemplary embodiment, each of the first outputter 288-2 and second outputter 289-2 of the outputter 287 is installed inside each of the first and second sound-emitting portions 564, and the audio data receiver 282, the buffer 283, the controller 284, and the audio outputter 285 may be installed inside each of the first and second sound-emitting portions 564.

Hereinafter, an audio output apparatus according to an exemplary embodiment and a glasses apparatus onto which the audio output apparatus is mounted will be explained.

Configurations somewhat similar to the ones described above in exemplary embodiments are not repeatedly explained to avoid redundancy and instead, mainly differences thereof are explained below.

Figure 15:
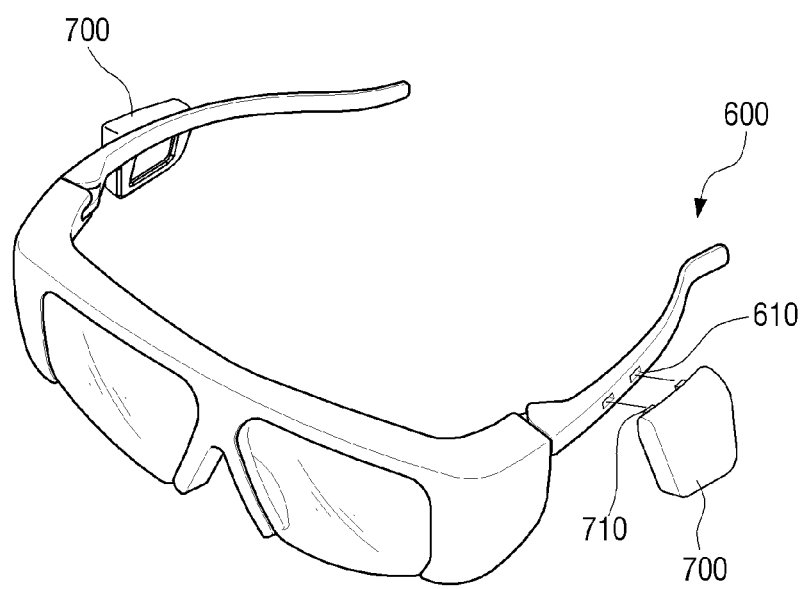
FIG. 15 is a view schematically illustrating an audio output apparatus according to an exemplary embodiment.
Figure 16:
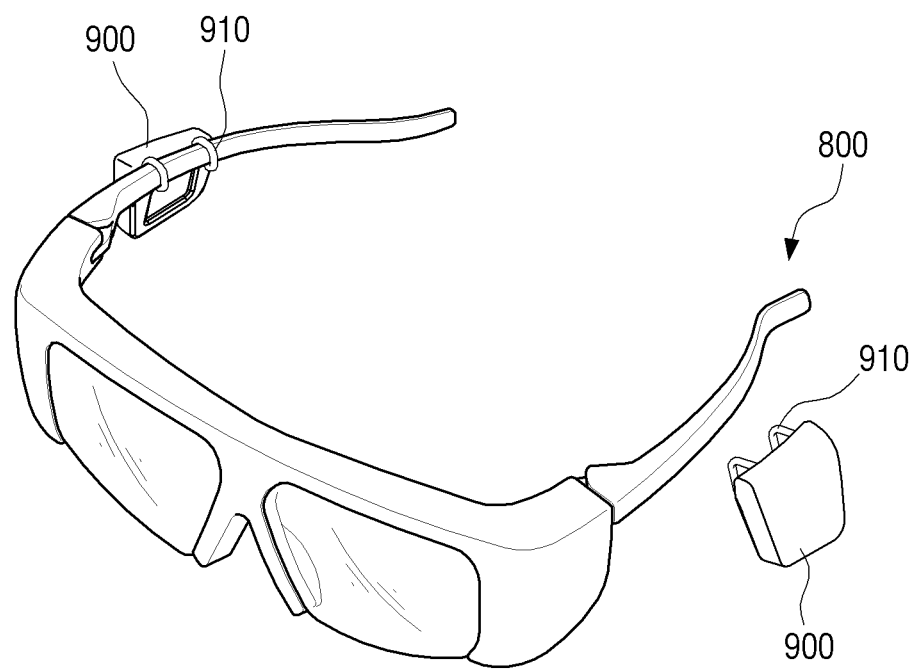
FIG. 16 is a view schematically illustrating an audio output apparatus according to another exemplary embodiment.

FIG. 15 is a view schematically illustrating an audio output apparatus according to an exemplary embodiment, and FIG. 16 is a view schematically illustrating an audio output apparatus according to another exemplary embodiment.

Referring to FIG. 15, the audio output apparatus 700 according to an exemplary embodiment includes the audio module 280 as illustrated in FIG. 2 therein. In other words, the audio output apparatus 700 may include the audio data receiver 282 which receives an audio data of one among the plurality of contents from the display apparatus which works in the multi-view mode to combine and output the plurality of contents, the controller 284 and the audio processor 286 which process the audio data to generate an audio sound, and the outputter 287 which outputs the audio sound.

The audio output apparatus 700 includes a connecting portion 710 which can be detachably mounted to a glasses apparatus 600 which works in conjunction with the display apparatus to support a multi-view mode.

The connecting portion 710 may be formed in a plurality of protruding ribs.

The glasses apparatus 600 includes a mounting portion 610 to which the connecting portion 710 is coupled for mounting the audio output apparatus 700 to the glasses apparatus 600.

The mounting portion 610 may be formed in a plurality of grooves corresponding to the rib shape so that the connecting portion 710 can be inserted into the mounting portion 610.

The glasses apparatus 600 may have two mounting portions 610 provided at positions corresponding to the ears of the user when the glasses apparatus 600 is worn so that two audio output apparatuses 700 can be mounted to the single glasses apparatus 600. Alternatively, one or more than two mounting portions 610 may be provided on the glasses apparatus 600 so that one or more than two audio output apparatuses 700 can be mounted thereon.

If the connecting portion 710 is inserted into the mounting portion 610 of the glasses apparatus 600, the audio output apparatus 700 is mounted onto the glasses apparatus 600, and can be detached from the glasses apparatus 600 depending on the user's needs.

Referring to FIG. 16, an audio output apparatus 900 according to another exemplary embodiment may have a connecting portion 910 formed in a ring shape.

In this case, when the audio output apparatus 900 is mounted to the glasses apparatus 800, the connecting portion 910 is slid onto the glasses apparatus 800 and is mounted in the form of wrapping the glasses apparatus 800. The audio output apparatus 900 can be separated from the glasses apparatus 800.

However, this does not limit the connecting portion 910 of the audio output apparatus 900 according to an exemplary embodiment. The connecting portion 910 may be formed in various shapes as long as it can detachably mount the audio output apparatus 900 onto the glasses apparatus 800. Accordingly, in an exemplary embodiment, other shapes and configurations may be readily apparent.

Programs to perform methods according to various exemplary embodiments may be stored on various types of recording media and may be used therefrom.

Specifically, codes for performing the above-described methods may be stored on various types of recording media which a terminal can read such as a random access memory (RAM), a flash memory, a read only memory (ROM), an erasable programmable read only memory (EPROM), an electronically erasable and programmable read only memory (EEPROM), a register, a hard disk, a removable disk, a memory card, a USB memory, a CD-Rom, etc.

Figure 17:
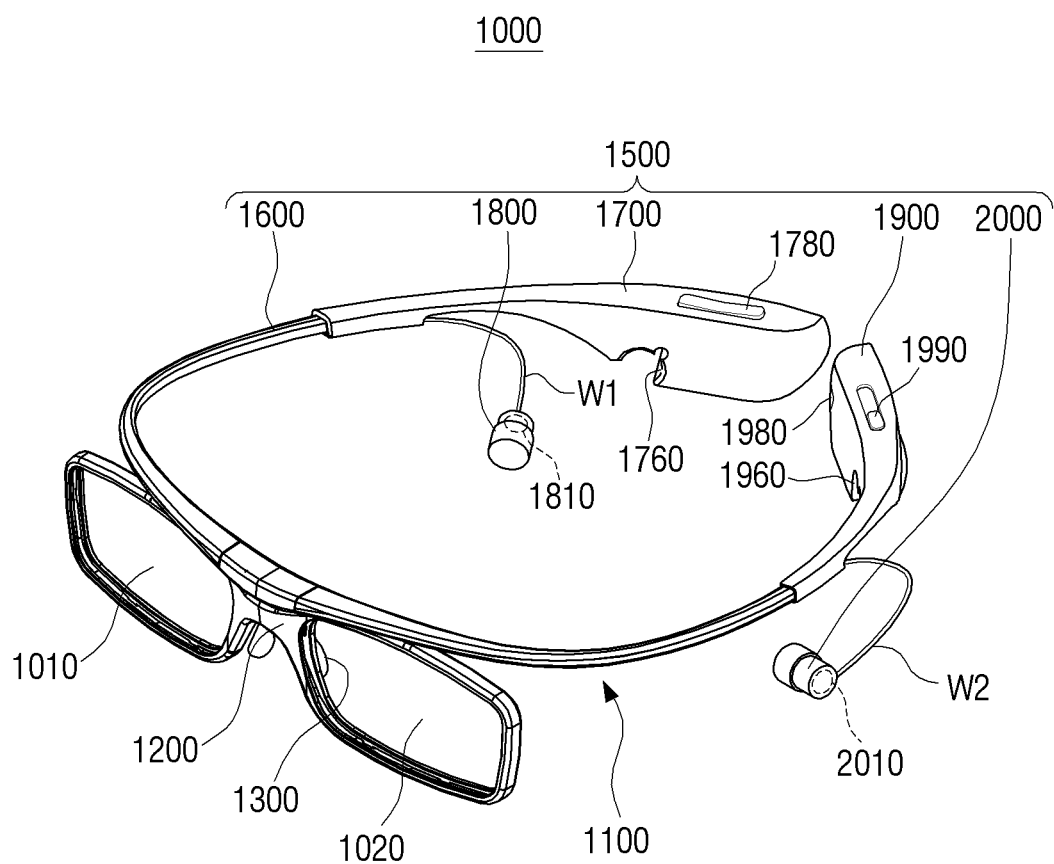
FIG. 17 is a perspective view schematically illustrating a glasses apparatus according to a fifth exemplary embodiment.

FIG. 17 is a perspective view schematically illustrating a glasses apparatus according to a fifth exemplary embodiment.

Referring to FIG. 17, the glasses apparatus 1000 includes a first glass 1010, a second glass 1020, a glasses frame 1100, and the above-described exemplary audio module 280 (see FIG. 2).

The glasses frame 1100 includes a glass mounting portion 1200, a nose pad 1300, and a wearing portion 1500.

The glass mounting portion 1200 is somewhat similar to the glass mounting portion 220 of the first exemplary embodiment as described above; therefore, in the fifth exemplary embodiment, a detail description thereof is omitted to avoid redundancy.

The nose pad 1300 is disposed on a rear surface of the glass mounting portion 1200. When the glasses apparatus 1000 is worn, the nose pad 1300 is supported by opposite sides of the user's nose and prevents the glasses apparatus 1000 from sliding down his or her nose.

The wearing portion 1500 includes a band portion 1600, a first body 1700, a first sound-emitting portion 1800, a second body 1900, and a second sound-emitting portion 2000.

The band portion 1600 is somewhat similar to the band portion 240 of the first exemplary embodiment described above; therefore, in the fifth exemplary embodiment, a detail description thereof is omitted to avoid redundancy.

The first body 1700 is connected to a first end of the band portion 1600. The audio data receiver 282, the buffer 283, the controller 284, and the audio outputter 285 of the audio module 280 (see FIG. 2) similar to the ones described above may be installed inside (or built in) the first body 1700. These exemplary elements may be installed inside one of the first body 1700 and the second body 1900. In addition, these exemplary elements may be separately installed inside each of the first body 1700 and the second body 1900.

The first body 1700 includes a first receiving groove 1760 and a volume adjusting portion 1780.

The first receiving groove 1760 is formed to have a groove shape corresponding to the shape of the first sound-emitting portion 1800 so that the first sound-emitting portion 1800 can be inserted into the first receiving groove 1760.

The first sound-emitting portion 1800 is connected to the first body 1700 through a first wire W1. The first sound-emitting portion 1800 includes the first outputter 288-2 of the audio module 280 (see FIG. 2) as described above. And the first sound-emitting portion 1800 includes a first sound-emitting hole 1810 to send the audio sound to the user and has an earphone shape to be inserted into the ear of the user.

The volume adjusting portion 1780 adjusts a volume of the audio sound of the glasses apparatus 1000; therefore, the user can listen to the audio sound with a desired volume by operating the volume adjusting portion 1780. The volume adjusting portion 1780 may be formed in the form of a button. The button may be formed so that one end of the button raises the volume and the other end of the button drops the volume. This is only one example; therefore, the volume adjusting portion 1780 may have two or more buttons, or may be formed in different shapes capable of adjusting the volume other than the button.

The second body 1900 is connected to a second end of the band portion 1600. As described above, the audio data receiver 282, the buffer 283, the controller 284, and the audio outputter 285 may be installed inside (or built in) the second body 1900. As an alternative exemplary embodiment, one of these elements may be installed inside the second body 1900.

The second body 1900 includes a second receiving groove 1960, a power/pairing portion 1980, and a channel changing portion 1990.

The second receiving groove 1960 is formed to have a groove shape corresponding to the shape of the second sound-emitting portion 2000 so that the second sound-emitting portion 2000 can be inserted into the second receiving groove 1960.

The second sound-emitting portion 2000 is connected to the second body 1900 using a second wire W2. The second sound-emitting portion 2000 includes the second outputter 289-2 of the audio module 280 (see FIG. 2) as described above by way of an example. The second sound-emitting portion 2000 includes a second sound-emitting hole 2010 to send the audio sound to the user and has an earphone shape to be inserted into the ear of the user.

The power/pairing portion 1980 is to turn on or off a power of the glasses apparatus 1000 and to perform pairing with the display apparatus. By operation of the power/pairing portion 1980, the user can turns on/off the power of the glasses apparatus 1000 and can perform pairing connection between the glasses apparatus 1000 and the display apparatus according to an exemplary embodiment.

The channel changing portion 1990 is to change content in a multi-view mode. When the user watches a specific content in the multi-view mode, the user operates the channel changing portion 1990 of the glasses apparatus 1000 and changes the specific content for another content of the multi-view mode. In an exemplary embodiment, the channel changing portion 1990 may be formed to move along the lengthwise direction of the second body 1900 for content changing operation. However, this is only one example and is not limiting, and the channel changing portion 1990 may be formed in various ways and types, for example, a button, a toggle button, etc., as long as this portion can change content.

In an exemplary embodiment, the volume adjusting portion 1780 is disposed in the first body 1700, and the power/pairing portion 1980 and the channel changing portion 1990 are disposed in the second body 1900. However, exemplary embodiment is not limited thereto. The volume adjusting portion 1780 may be disposed in the second body 1900, and the power/pairing portion 1980 and the channel changing portion 1990 may be disposed inside the first body 1700. Alternatively, by way of another example, the power/pairing portion 1980 and the channel changing portion 1990 may be separated and disposed in each of the first and second bodies 1700 and 1900. In other words, it is sufficient for the volume adjusting portion 1780, the power/pairing portion 1980, and the channel changing portion 1990 to be provided somewhere on the glasses apparatus 1000. Also, although not illustrated, the glasses apparatus 1000 may have other buttons to control action of the glasses apparatus 1000, other than buttons as described above. In other words, exemplary configuration of the buttons shown in FIG. 17 is provided by way of an example only and not by way of a limitation.

Figure 18:
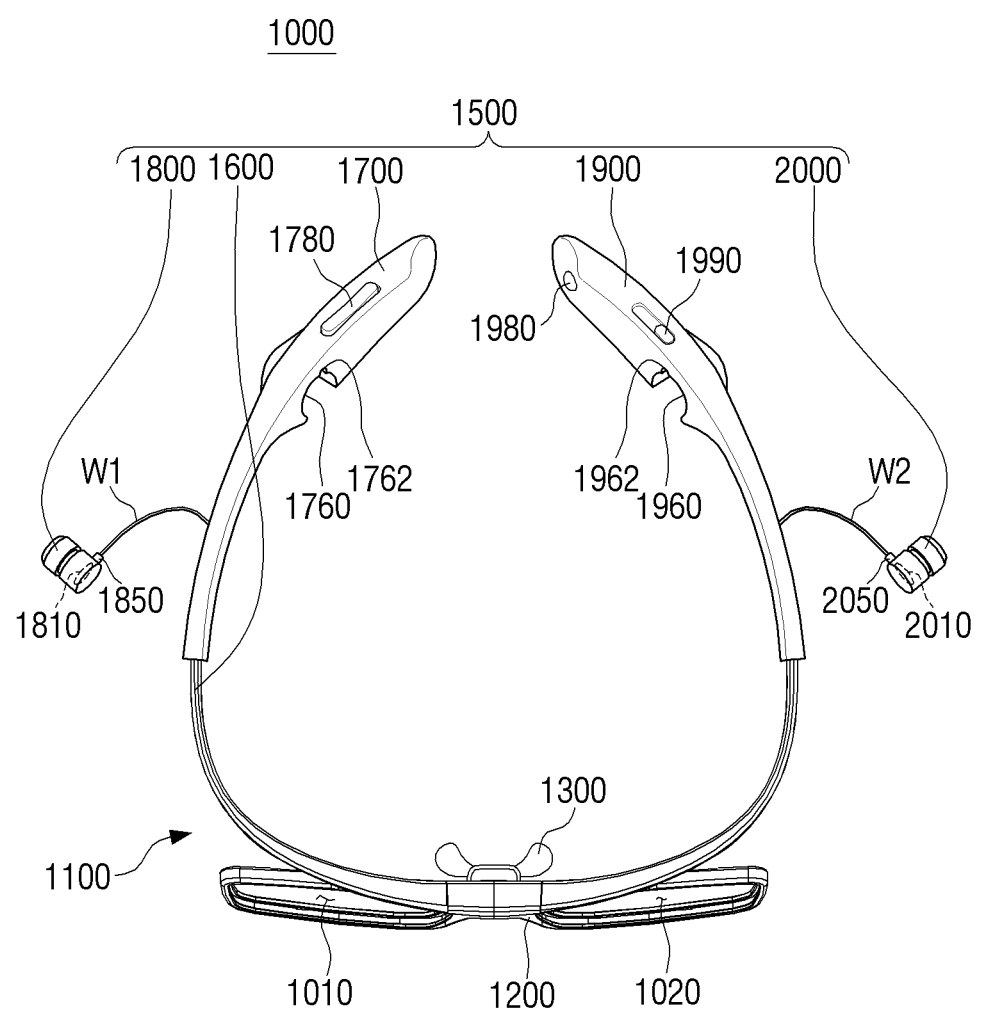
FIGS. 18 and 19 are views schematically illustrating an appearance of a glasses apparatus when it is used and when it is not used, respectively, according to a fifth exemplary embodiment.
Figure 19:
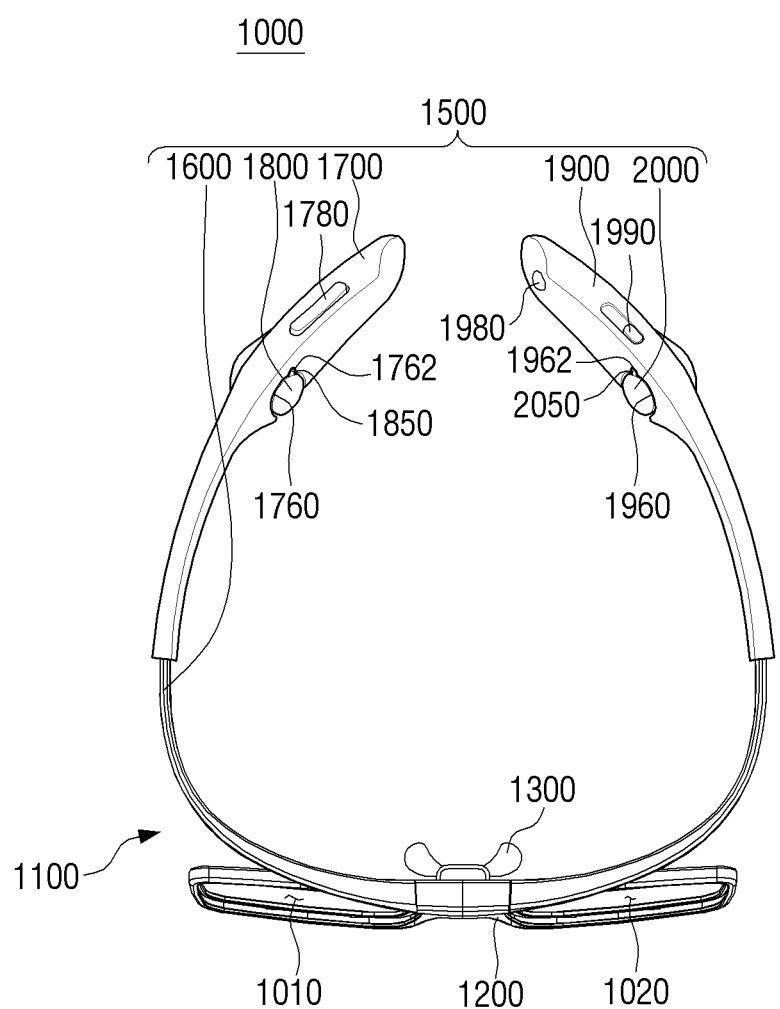

FIGS. 18 and 19 are views schematically illustrating a glasses apparatus when it is used and when it is not used, respectively, according to a fifth exemplary embodiment.

Referring to FIG. 18, when using the glasses apparatus 1000, the user wears the first sound-emitting portion 1800 and the second sound-emitting portion 2000 in his or her ears, and listens to the audio sound. A wearing position of each of the first sound-emitting portion 1800 and the second sound-emitting portion 2000 can be properly adjusted based on the user by using the first and second wires W1 and W2.

On the other hand, the first sound-emitting portion 1800 is provided with a first wire connecting portion 1850 to which the first wire W1 is connected. The second sound-emitting portion 2000 is provided with a second wire connecting portion 2050 to which the second wire W2 is connected. The first receiving groove 1760 is provided with a first wire connecting portion insert groove 1762 into which the first wire connecting portion 1850 is inserted. The second receiving groove 1960 is provided with a second wire connecting portion insert groove 1962 into which the second wire connecting portion 2050 is inserted.

Referring to FIG. 19, when the glasses apparatus 1000 is not used, the user inserts the first sound-emitting portion 1800 into the first receiving groove 1760 of the first body 1700 and inserts the second sound-emitting portion 2000 into the second receiving groove 1960 of the second body 1900 according to an exemplary embodiment. At this time, the first wire connecting portion 1850 of the first sound-emitting portion 1800 is inserted into the first wire connecting portion insert groove 1762 of the first receiving groove 1760. The second wire connecting portion 2050 of the second sound-emitting portion 2000 is inserted in the second wire connecting portion insert groove 1962 of the second receiving groove 1960.

Eventually, the glasses apparatus 1000 according to an exemplary embodiment is formed so that when the glasses apparatus 1000 is not used, the first and second sound-emitting portions 1800 and 2000 are inserted and kept in the first and second receiving grooves 1760 and 1960 formed on the first and second bodies 1700 and 1900. In an exemplary embodiment, when the glasses apparatus 1000 is not used, the glasses apparatus 1000 can be neatly kept by the above-described exemplary method. Also, in an exemplary embodiment, when the glasses apparatus 1000 is not used, the glasses apparatus 1000 can be protected from breaking and damage such that the first and second sound-emitting portions 1800 and 2000 are separated from the first and second bodies 1700 and 1900 due to carelessness.

As described above, the display apparatus works in a mode selected from the general mode and the multi-view mode. The general mode is a mode in which a single content is reproduced and the multi-view mode is a mode in which a plurality of contents are simultaneously reproduced. In the general mode, the display apparatus outputs the audio signal of the content through a speaker provided on the body of the display apparatus. However, in the multi-view mode, the display apparatus has difficulty using the body speaker since the plurality of contents are reproduced. Therefore, in the multi-view mode, the audio signal of each of the plurality of contents is provided to each glasses apparatus so that the audio signal is output using an audio outputting module provided on each glasses apparatus. In an exemplary embodiment, audio outputting means which corresponds to the sound emitting portions described above is provided. A method of transmitting the audio signal may be implemented in various ways according to exemplary embodiments. Hereinafter, configuration and operation of a display apparatus and a glasses apparatus for processing an audio signal will be explained in detail according to exemplary embodiments.

Figure 20:
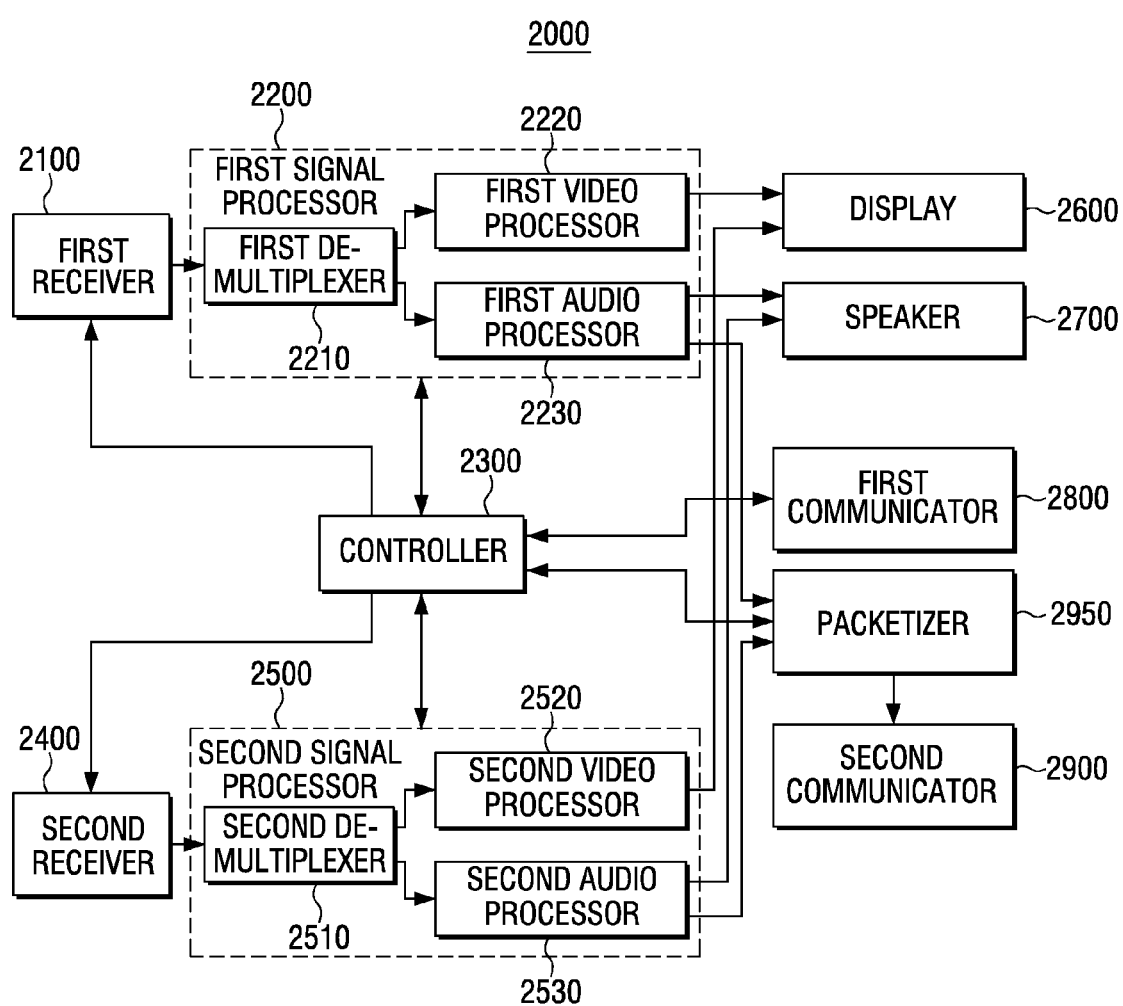
FIG. 20 is a block diagram illustrating a display apparatus according to an exemplary embodiment.

FIG. 20 is a block diagram illustrating a display apparatus according to an exemplary embodiment. Referring to FIG. 20, a display apparatus 2000 includes a first receiver 2100, a first signal processor 2200, a controller 2300, a second receiver 2400, a second signal processor 2500, a display 2600, a speaker 2700, a first communicator 2800, a packetizer 2950, and a second communicator 2900.

The first receiver 2100 and the second receiver 2400 receive different contents from various sources. For example, at least one of the first receiver 2100 and the second receiver 2400 may be implemented in form of a tuner to receive a broadcast content transmitted through a broadcast network, or may be implemented in form of an interface to receive a content read out from a storage medium which is built in or connected to the display apparatus. In addition, at least one of the first receiver 2100 and the second receiver 2400 may include a network interface card to stream or download content from a server apparatus through an IP communication network.

Even if a broadcast signal is received, the configuration of the receivers may be diversely designed according to a broadcasting standard. The broadcasting standard includes advanced television system committee (ATSC), digital video broadcasting (DVB), and integrated services digital broadcasting-terrestrial (ISDB-T) methods. The configuration and operation of the first and second receivers 2100 and 2400 may be different according to the above broadcasting standard. For example, if the ATSC standard is employed, the first and second receivers 2100 and 2400 may include an antenna, an RF down converter, a demodulator, an equalizer, a de-multiplexer, an RS decoder, a de-interleaver, and etc. Since the detailed configuration for transmitting and receiving signals according to each broadcasting standard is described in the standard document of each broadcasting standard, detailed illustration and explanation are omitted to avoid redundancy.

If a multi-view mode is executed, the controller 2300 activates the first receiver 2100 and the second receiver 2400 and controls them to each receive a broadcast signal, respectively.

A broadcast signal received by the first receiver 2100, that is, a first content is provided to the first signal processor 2200. The first signal processor 2200 includes a first de-multiplexer 2210, a first video processor 2220, and a first audio processor 2230. The first de-multiplexer 2210 de-multiplexes the first content which is received through the first receiver 2100 and outputs a video data and an audio data. The video data is provided to the first video processor 2220. The first video processor 2220 performs various video signal processing such as decoding, de-interleaving, scaling, and frame rate conversion with respect to the video data, and generates a video frame. The first audio processor 2230 performs various audio signal processing such as audio decoding, noise filtering, and amplification with respect to the audio data output from the first de-multiplexer 2210.

A broadcast signal received by the second receiver 2400, that is, a second content is provided to the second signal processor 2500. The second signal processor 2500 includes a second de-multiplexer 2510, a second video processor 2520, and a second audio processor 2530. The second de-multiplexer 2510 de-multiplexes the second content, and provides a video data to the second video processor 2520 and provides an audio data to the second audio processor 2530. Accordingly, a video frame and an audio signal for the second content may be generated.

In the multi-view mode, the display 2600 alternately displays the video frame of the first content and the video frame of the second content on a basis of at least one frame.

The controller 2300 generates a synchronization signal to synchronize a display timing of the video frame of the first content and a display timing of the video frame of the second content with an operation of each glasses apparatus, and transmits the synchronization signal through the first communicator 2800. The first communicator 2800 may perform communication according to various communication standards as described above. For example, the first communicator 2800 may transmit the synchronization signal in the Bluetooth method.

In the multi-view mode, the controller 2300 controls the first audio processor 2230 and the second audio processor 2530 to provide the audio signals of the first and second contents to the packetizer 2950

The packetizer 2950 mixes the audio signals of each content and generates a communication packet. The second communicator 2900 transmits the communication packet generated by the packetizer 2950 through a predetermined frequency band. The frequency band may be selected from among a plurality of candidate bands. For example, if one of the frequency bands such as 2.4 GHz, 5.2 GHz, and 5.5 GHz is arbitrarily selected and is available, the communication packet may be transmitted through the selected frequency band.

Figure 21:
FIG. 21 is a view illustrating a structure of audio data of a plurality of contents being transmitted using a single packet according to an exemplary embodiment.

FIG. 21 is a view illustrating a structure of a packet generated by the packetizer 2950 according to an exemplary embodiment. Referring to FIG. 21, the audio signal of the first content and the audio signal of the second content may be recorded on a payload region in a single packet.

The second communicator 2900 may perform communication according to a communication standard which is different from that of the first communicator 2800 according to an exemplary embodiment. For example, the second communicator 2900 may be implemented in form of an RF communication module. In this case, the second communicator 2900 modulates the packet generated by the packetizer 2950 into an RF signal, and transmits the RF signal.

On the other hand, in the general mode, the controller 2300 may activate only one of the first receiver 2100 and the second receiver 2400 and may receive a broadcast signal. If the first receiver 2100 is activated, the video data of the first content is processed by the first signal processor 2200 and is provided to the display 2600, and the audio data of the first content is provided to the speaker 2700. The controller 2300 may output the audio signal by selectively activating the speaker 2700 or the packetizer 2950 and the second communicator 2900 according to a selected mode.

In the above exemplary embodiment, the audio signals of the plurality of contents are packetized by a single packet and are transmitted. However, the audio signal of each content may be packetized in a form of a different packet and may be transmitted.

That is, in the multi-view mode, the packetizer 2950 packetizes the audio signal output from the first audio processor 2230 and the audio signal output from the second audio processor 2530 separately, and then, alternately transmits the audio signals using the same frequency band at time intervals.

Figure 22:
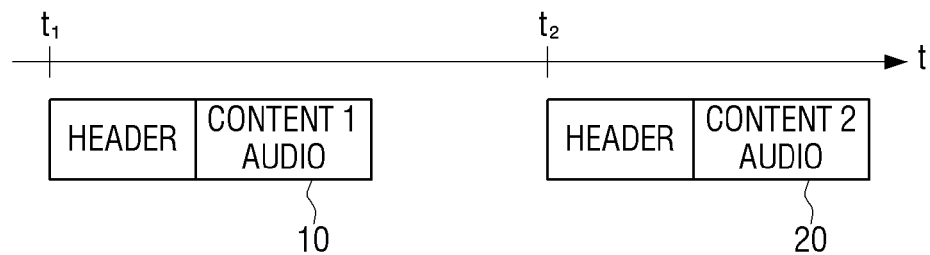
FIG. 22 is a view illustrating a plurality of contents being packetized by separate packets and being transmitted according to an exemplary embodiment.

FIG. 22 is a view illustrating a packet in an exemplary embodiment in which an audio signal of each content is transmitted using a different packet. Referring to FIG. 22, a first packet 10 including the audio data of the first content is transmitted at a time t1, and a second packet 20 including the audio data of the second content is transmitted at a time t2. A transmission time difference between the two packets may be known to the display apparatus and the glasses apparatus. If the time difference is set to 2.5 ms, the glasses apparatus for watching the first content and the glasses apparatus for watching the second content repeatedly receive and process the audio packets at time intervals of 2.5 ms.

The audio signals of the plurality of contents may be packetized by different packets and then are modulated into RF signals of different frequency bands and may be output. That is, the second communicator 2900 modulates the first packet including the audio signal of the first content into an RF signal of a first frequency band, modulates the second packet including the audio signal of the second content into an RF signal of a second frequency band, and may output the signals without a time difference. In this case, frequency information of each RF signal may be included in synchronization information which is transmitted using the first communicator 2800.

As described above, the operations of transmitting the audio signals may be implemented in various ways according to exemplary embodiments. Accordingly, an operation of a glasses apparatus to receive the audio signals may be different according to exemplary embodiments.

Figure 23:
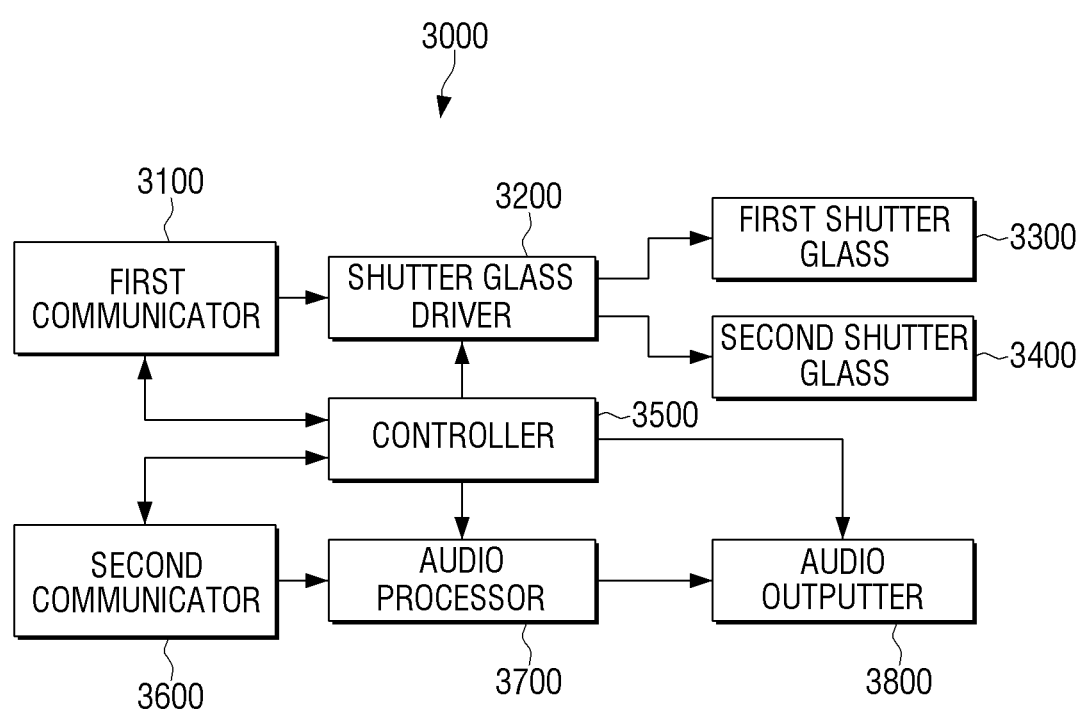
FIG. 23 is a view illustrating another exemplary configuration of a glasses apparatus which can process a transmitted audio signal according to various exemplary embodiments.

FIG. 23 is a block diagram illustrating another configuration of a glasses apparatus which receives and processes audio signals according to an exemplary embodiment. Referring to FIG. 23, a glasses apparatus 3000 includes a first communicator 3100, a shutter glass driver 3200, a first shutter glass 3300, a second shutter glass 3400, a controller 3500, a second communicator 3600, an audio processor 3700, and an audio outputter 3800.

The first communicator 3100 receives a synchronization signal which is transmitted from a display apparatus. A configuration and operations of the first communicator 3100 may be different according to a communication standard that is employed by the display apparatus. For example, if the display apparatus 2000 (shown in FIG. 20) transmits a synchronization signal according to the Bluetooth standard, the first communicator 3100 performs Bluetooth pairing and receives the synchronization signal from the display apparatus.

The shutter glass driver 3200 drives the first and second shutter glasses 3300 and 3400 according to the synchronization signal. In the multi-view mode, the shutter glass driver 3200 applies a driving signal to turn on the first and second shutter glasses 3300 and 3400 simultaneously according to a frame display timing of a content selected by the glasses apparatus. On the other hand, in the 3D mode, the shutter glass driver 3200 may alternately apply the driving signal to turn on the first shutter glass 3300 according to a display timing of a left-eye image frame and to turn on the second shutter glass 3400 according to a display timing of a right-eye image frame.

In an exemplary embodiment, the controller 3500 controls an overall operation of the glasses apparatus 3000 according to a user selection. For example, every time that a button provided on the glasses apparatus 3000 is selected, the multi-view mode and the 3D mode may be alternately selected. Also, if a button is selected in the multi-view mode, the controller 3500 may adjust driving timings of the first and second shutter glasses 3300 and 3400 every time that the button is selected and may change a watchable view.

The second communicator 3600 receives the audio signals which are transmitted from the display apparatus. The second communicator 3600 may be implemented in form of an RF communication module by way of an example and not by way of a limitation.

As described above, the audio signal is transmitted in various methods according to various exemplary embodiments. If the audio signals of the plurality of contents are packetized by a single packet and are transmitted as in the present exemplary embodiment, the controller 3500 controls the audio processor 3700 to selectively detect the audio data of the first content or the audio data of the second content from a predetermined region in a payload region of the received packet, and to process the audio data. That is, if the glasses apparatus 3000 is turned on, the controller 2500 controls the second communicator 3600 to scan the above-described candidate bands in sequence, and determines whether the audio packet is received or not. If the audio packet is received, the controller 3500 identifies a packet header region and selects a region on which the audio data of the content currently synchronized with the shutter glass driver 3200 is placed from the payload region.

The audio processor 3700 processes the audio data recorded on the selected region and generates a sound signal. The generated sound signal is output through the audio outputter 3800. Shape and location of the audio outputter 3800 may be implemented in a variety of ways as described above.

According to another exemplary embodiment, the audio signals of the plurality of contents may be packetized by separate packets and may be transmitted.

Figure 24:
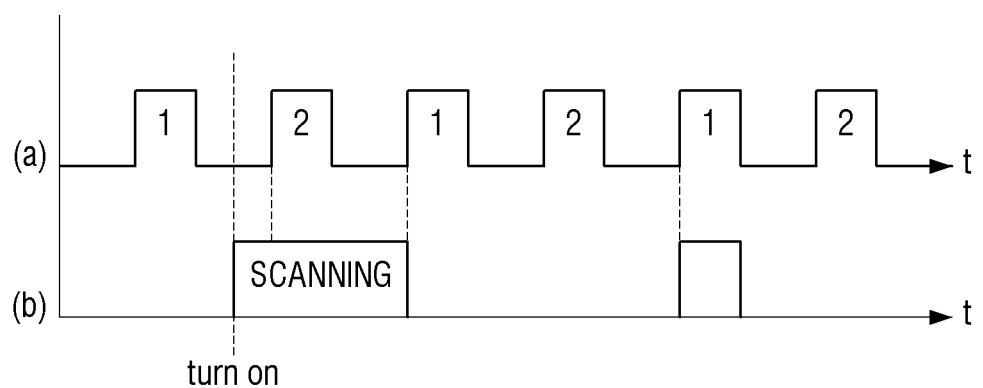
FIG. 24 is a view illustrating a motion of a glasses apparatus which selectively receives an audio signal transmitted in a form of a plurality of packets and processes the audio signal according to various exemplary embodiment.

FIG. 24 is a view illustrating operations of a glasses apparatus in which audio signals are transmitted using a plurality of packets according to an exemplary embodiment. In FIG. 24(*a*), a first packet carrying the audio data of the first content and a second packet carrying the audio data of the second content are alternately transmitted.

If the glasses apparatus is turned on, the controller 3500 performs scanning. Specifically, the second communicator 3600 may tune to the plurality of candidate bands such as 2.4 GHz, 5.2 GHz, and 5.5 GHz in sequence, and may receive signals. If the glasses apparatus 3000 is synchronized with the first content, the scanning is finished when the reception of the first packet is identified. For example, if the first packet and the second packet have a packet format shown in FIG. 22, the controller 3500 may determine whether the first packet is received or not based on an identifier which is recorded on a header or a payload portion of the first packet. The controller 3500 may activate the second communicator 3600 at regular time intervals using a transmission time difference between the first packet and the second packet. As described above, information on the transmission time difference may be shared by the display apparatus and the glasses apparatus beforehand, and may be stored in each of the display apparatus and the glasses apparatus. The controller 3500 receives the first packet at a time when the reception of the first packet is identified and deactivates the second communicator 3600 until the next first packet is received, and activates the second communicator 3600 at a time when the first packet is received again.

According to another exemplary embodiment, the audio data of each content may be transmitted as a different frequency signal. The controller 3500 may identify frequency information corresponding to each of the contents based on synchronization information received through the first communicator 3100. Accordingly, the controller 3500 controls the second communicator 3600 to tune to a frequency band corresponding to a currently synchronized content and receive a signal. As a result, the image frame and the audio data of the content which is seen through the first and second shutter glasses 3300 and 3400 are synchronized with each other and are provided.

The synchronizing method and the audio signal processing method according to the above-described various exemplary embodiments may be coded as software. The software may be recorded on a non-transitory computer readable medium and may be used in apparatuses such as display apparatuses or glasses apparatuses.

The non-transitory computer readable medium refers to a medium that stores data semi-permanently rather than storing data for a very short time, such as a register, a cache, and a memory, and is readable by an apparatus. Specifically, the above-described various programs may be stored in a non-transitory computer readable medium such as a CD, a DVD, a hard disk, a Blueray disk, a USB, a memory card, and a ROM.

While exemplary embodiments have been described, additional variations and modifications of the exemplary embodiments may occur to those skilled in the art from description of exemplary embodiments. Therefore, it is intended that the appended claims shall be construed to include both the above exemplary embodiments and all such variations and modifications that fall within the spirit and scope of the inventive concepts. It is understood that all possible changes and/or modifications in form and details may be made therein without departing from the spirit and scope of an inventive concept as defined by the appended claims and their equivalents. The scope is defined not by the detailed description of exemplary embodiments but by the appended claims, and their equivalents and all differences within the scope will be construed as being included in an inventive concept.

What is claimed is:

1. A glasses apparatus comprising:
a first interface module which receives a synchronization signal in a first wireless communication method;
a glasses frame comprising a two part wearing portion, a first part of the wearing portion supports a side of a user head and a second part of the wearing portion supports the side and rear of the user head, wherein first and second parts of the wearing portion are interconnected to each other such that the length of the wearing portion is variable;

a first glass and a second glass mounted on the glasses frame and which are driven in synchronization with one of a plurality of contents output on a display apparatus based on the synchronization signal;

a second interface module which receives audio signals of at least one content from among the plurality of contents in a second wireless communication method;

a controller which selects an audio signal of said one content from among the audio signals received by the second interface module; and an audio outputter which outputs the selected audio signal of said one content and which comprises a first outputter which outputs the selected audio signal to a first user ear and a second outputter which outputs the selected audio signal to a second user ear, wherein the first outputter and the second outputter are integrally formed with the second part of the wearing portion of the glasses frame.

2. The glasses apparatus of claim 1, wherein the audio outputter is installed inside the glasses frame.

3. The glasses apparatus of claim 2, wherein the audio outputter comprises:

an audio data processor which processes the selected audio signal to generate an audio sound; and an outputter which outputs the generated audio sound.

4. The glasses apparatus of claim 3, wherein the glasses frame comprises:

a glasses mounting portion which holds the first glass and the second glass; and a wearing portion which is connected to the glass mounting portion and is worn by a user.

5. The glasses apparatus of claim 4, wherein
the first outputter outputs the audio sound to the first ear of the user; and the second outputter outputs the audio sound to the second ear of the user, and wherein the wearing portion comprises:

a band portion connected to the glass mounting portion;

a first holding portion which is connected to a first end of the band portion, which has a first outputter mounted therein, and which comprises a first sound-emitting hole; and a second holding portion which is connected to a second end of the band portion, which has a second outputter mounted therein, and which comprises a second sound-emitting hole.

6. The glasses apparatus of claim 5, wherein
the audio data processor is provided inside one of the first and second holding portions.

7. The glasses apparatus of claim 5, wherein
the first holding portion and the second holding portion are formed to slide on the band portion.

8. The glasses apparatus of claim 5, wherein the first holding portion comprises:

a first body connected to a first end of the band portion; and a first sound-emitting portion which is provided on the first body and comprises the first sound-emitting hole, and wherein the second holding portion comprises:

a second body connected to a second end of the band portion; and a second sound-emitting portion which is provided on the second body and comprises the second sound-emitting hole.

9. The glasses apparatus of claim 8, wherein
the first outputter is provided inside the first sound-emitting portion and the second outputter is provided inside the second sound-emitting portion.

10. The glasses apparatus of claim 9, wherein
the audio data processor is positioned inside one of the first body and the second body.

11. The glasses apparatus of claim 8, wherein
each of the first sound-emitting portion and the second sound-emitting portion is formed integrally with the first body and the second body, respectively.

12. The glasses apparatus of claim 8, wherein
each of the first sound-emitting portion and the second sound-emitting portion is rotatably provided on the first body and the second body, respectively.

13. The glasses apparatus of claim 12, wherein
a rotation direction of each of the first sound-emitting portion and the second sound-emitting portion is parallel to a side surface of a user when the user wears the glasses apparatus.

14. The glasses apparatus of claim 5, wherein
the first holding portion comprises:

a first body connected to a first end of the band portion;

a first connecting link provided on the first body; and a first inserting member which is provided on the first connecting link and comprises the first sound-emitting hole, and wherein the second holding portion comprises:

a second body connected to a second end of the band portion;

a second connecting link provided on the second body; and a second inserting member which is provided on the second connecting link and comprises the second sound-emitting hole.

15. The glasses apparatus of claim 14, wherein
each of the first connecting link and the second connecting link is rotatable on the first body and the second body, respectively.

16. The glasses apparatus of claim 15, wherein
a rotation direction of each of the first connecting link and the second connecting link is parallel to a side surface of a user when the user wears the glasses apparatus.

17. The glasses apparatus of claim 15, wherein
each of the first inserting member and the second inserting member is rotatable on the first connecting link and the second connecting link, respectively.

18. The glasses apparatus of claim 17, wherein:

a rotation axis of the first connecting link and a rotation axis of the first inserting member are orthogonal to each other, and a rotation axis of the second connecting link and a rotation axis of the second inserting member are orthogonal to each other.

19. The glasses apparatus of claim 3, wherein
the first outputter outputs the audio sound to the first ear of the user; and the second outputter outputs the audio sound to the second ear of the user, and the glasses frame comprises:

a glasses mounting portion which holds the first glass and the second glass;

a band portion connected to the glass mounting portion;

a first body connected to a first end of the band portion;

a first sound-emitting portion which is connected to the first body using a first wire, which comprises the first outputter mounted therein, and which is inserted into a first ear of the user;
a second body connected to a second end of the band portion, and
a second sound-emitting portion which is connected to the second body using a second wire, which comprises the second outputter mounted therein, and which is inserted into a second ear of the user.

20. The glasses apparatus of claim 19, wherein
the audio data processor is provided inside one of the first body and the second body.

21. The glasses apparatus of claim 1, wherein
the audio outputter comprises a rechargeable battery or a replaceable battery, which provides power to the outputter.

22. The glasses apparatus of claim 1, wherein
the second interface module receives the audio sound by the second wireless communication method from the display apparatus, and
the second wireless communication method comprises one of a radio-frequency, a Bluetooth, a zigbee, and an infrared communication.

23. The glasses apparatus of claim 1, wherein the second part of the wearing portion comprises a right wearing part which supports right side and the rear of the user head and a left wearing part which supports left side and the rear of the user head and wherein the first outputter is integrally formed with the right wearing part and the second outputter is integrally formed with the left wearing part and wherein the first outputter abuts the first part of the wearing portion and wherein the second outputter abuts the first part of the wearing portion.

24. The glasses apparatus of claim 1, wherein the first part of the wearing portion comprises a right side part which supports the right side of the user head and a left side art which supports the left side of the user head, wherein the second part of the wearing portion comprises a right back part which, supports the right side and the rear of the user head and a left back part, which supports the left side and the rear of the user head, and wherein at least a portion of the first outputter is inside the right back part and at least a portion of the second outputter is inside the left back part.

25. The glasses apparatus of claim 1, wherein the audio outputter further comprises an audio data processor which processes the selected audio signal to generate an audio sound and the first and second outputters output the generated audio sound, wherein the second part of the wearing portion is connected to the first part of the wearing portion at a location where the audio outputter is positioned.

26. A glasses apparatus comprising:
a first interface module which receives a synchronization signal in a first wireless communication method;
a glasses frame;
a first glass and a second glass mounted on the glasses frame and which are driven in synchronization with one of a plurality of contents output on a display apparatus based on the synchronization signal;
a second interface module which receives audio signals of at least one content from among the plurality of contents in a second wireless communication method;
a controller which selects an audio signal of said one content from among the audio signals received by the second interface module; and
an audio outputter which outputs the selected audio signal of said one content,
wherein the audio outputter is integrally formed with the glasses frame,
wherein the audio outputter is installed inside the glasses frame,
wherein the audio outputter comprises:
an audio data processor which processes the selected audio signal to generate an audio sound; and
an outputter which outputs the generated audio sound,
wherein the glasses frame comprises:
a glasses mounting portion which holds the first glass and the second glass; and
a wearing portion which is connected to the glass mounting portion and is worn by a user,
wherein the outputter comprises:
a first outputter which outputs the audio sound to a first ear of the user; and
a second outputter which outputs the audio sound to the second ear of the user, and
wherein the wearing portion comprises:
a band portion connected to the glass mounting portion;
a first holding portion which is connected to a first end of the band portion, which has the first outputter mounted therein, and which comprises a first sound-emitting hole; and
a second holding portion which is connected to a second end of the band portion, which has a second outputter mounted therein, and which comprises a second sound-emitting hole,
wherein the first holding portion comprises:
a first body connected to a first end of the band portion;
a first connecting link provided on the first body; and
a first inserting member which is provided on the first connecting link and comprises the first sound-emitting hole, and
wherein the second holding portion comprises:
a second body connected to a second end of the band portion;
a second connecting link provided on the second body; and
a second inserting member which is provided on the second connecting link and comprises the second sound-emitting hole,
wherein each of the first connecting link and the second connecting link is rotatable on the first body and the second body, respectively,
wherein each of the first inserting member and the second inserting member is rotatable on the first connecting link and the second connecting link, respectively, and
wherein each of the first inserting member and the second inserting member is formed to slide on the first connecting link and the second connecting link, respectively.

27. The glasses apparatus of claim 26, wherein
a sliding direction of each of the first inserting member and the second inserting member is parallel to the rotation axis of the first inserting member and the second inserting member, respectively.

* * * * *